United States Patent
Nakajima et al.

[11] Patent Number: 5,740,523
[45] Date of Patent: Apr. 14, 1998

[54] RADIO RECEIVER

[75] Inventors: Yukihiro Nakajima; Masami Tsukuda, both of Yokohama, Japan

[73] Assignee: Shintom Co., Ltd., Kanagawa, Japan

[21] Appl. No.: 392,881

[22] PCT Filed: Jun. 29, 1994

[86] PCT No.: PCT/JP94/01058

§ 371 Date: Feb. 27, 1995

§ 102(e) Date: Feb. 27, 1995

[87] PCT Pub. No.: WO95/01674

PCT Pub. Date: Jan. 12, 1995

[30] Foreign Application Priority Data

Jun. 30, 1993 [JP] Japan ..................... 5-186775

[51] Int. Cl.⁶ .................................. H04B 1/18
[52] U.S. Cl. ............... 455/186.1; 455/134; 455/161.2; 455/205; 455/226.2; 455/296; 455/303; 381/10
[58] Field of Search .................. 455/296, 186.1, 455/226.1, 161.3, 161.2, 161.1, 164.1, 164.2, 188.1, 266, 303, 132, 133, 134, 135, 185.1, 205, 207, 227, 226.2, 226.3; 381/3, 4, 10, 7, 15

[56] References Cited

U.S. PATENT DOCUMENTS

| | | | |
|---|---|---|---|
| 4,087,750 | 5/1978 | Allen et al. | 455/296 |
| 4,356,567 | 10/1982 | Eguchi et al. | 455/266 |
| 4,903,328 | 2/1990 | Ichikawa | 455/164.2 |
| 4,926,498 | 5/1990 | Suzuki et al. | 455/133 |
| 5,201,062 | 4/1993 | Nakamura et al. | 455/296 |
| 5,390,344 | 2/1995 | Nagata | 455/296 |
| 5,526,530 | 6/1996 | Sueoka et al. | 455/218 |
| 5,564,093 | 10/1996 | Matsumoto | 455/266 |

FOREIGN PATENT DOCUMENTS

| | | |
|---|---|---|
| 57-113543 | 7/1982 | Japan. |
| 1-255331 | 10/1989 | Japan. |
| 3-212027 | 9/1991 | Japan. |

*Primary Examiner*—Reinhard J. Eisenzopf
*Assistant Examiner*—Doris To
*Attorney, Agent, or Firm*—Oliff & Berridge

[57] ABSTRACT

A radio receiver in which, even with large variability in the components, the receiving conditions can be set according to the antenna input level in a uniform way. A high frequency cutoff circuit 30 reduces high frequency components in a composite signal by a high frequency cutoff ratio depending on a voltage applied to an HCC pin 30a. A principal signal included in the composite signal is demodulated by a principal signal demodulator 32, and a subsidiary signal is demodulated by a subsidiary signal demodulator 34. In the subsidiary signal demodulator 34, based on a voltage applied to a SPC pin 34a, the subsidiary signal demodulation level is varied from 0 to 100% according to stereo separation characteristics, to control the stereo separation. A matrix circuit 36 regenerates left and right channel signals from the demodulated principal signal and subsidiary signal. A microprocessor 20 inputs a signal meter output voltage from an FM detector IC 12. In a calculation unit 24, based on a signal meter output reference voltage value and a control reference voltage stored in an EEPROM 18, the signal meter output voltage peculiar to a particular unit is corrected, and an SPC and HCC voltages free of variability from unit to unit are determined according to the antenna input level and applied to the HCC pin 30a and SPC pin 34a.

19 Claims, 14 Drawing Sheets

RADIO RECEIVER

FIELD OF THE INVENTION

The present invention relates to a radio receiver equipped with an FM and/or AM receiving function. More particularly, the present invention relates to a radio receiver equipped with functions such as a high frequency cutoff function, a stereo separation adjustment function, an automatic receiving frequency seek function, an automatic mono/stereo selector function, or an automatic wide/narrow selector function for selecting a band with.

BACKGROUND OF THE INVENTION

When operating an FM receiver, the problem exists of the characteristic FM noise, when the signal is weak and the antenna input level is low. The drop in the S/N ratio consequent on a weak signal is much greater for a stereo signal than for a monaural signal, and it is known for the stereo drop to be 20 dB or more compared with the monaural drop.

A conventional response to this problem is to vary the stereo separation when the signal is weak, to increase the S/N ratio. For example, as shown in FIG. 4, based on a composite signal from an FM detector IC 12, an FM multiplexer IC 14, which regenerates left and right signals, demodulates the subsidiary signal in this composite signal. At this point, by varying the demodulation level of this subsidiary signal it is possible to control the stereo separation for a weak signal.

On the other hand, for monaural broadcasts, the drop in the S/N ratio for a weak signal can be countered by implementing a high frequency cutoff function, reducing the level of high frequencies, and improving the subjective S/N ratio. The FM multiplexer IC 14 of FIG. 4 has a built-in high frequency cutoff function. The high frequency cutoff function and elements relating to it are also hereafter referred to by the abbreviation HCC (for "High Cut Control"), and the stereo separation control function similarly by the abbreviation SPC ("Separation Control").

The FM multiplexer IC 14 has an HCC pin 30a and an SPC pin 34a. The signal meter output voltage from the FM detector IC 12, representing the strength of the signal, is divided by resistors R1 and R2, and the result tog HCC and SPC voltages are applied to the pins 30a and 34a respectively.

In a conventional system as described above, the high frequency cutoff and stereo separation control functions are adjusted by means of the variable resistor R2 connected to the pins 30a and 34a. Not only, however, does this require troublesome manual operations, but it is also often extremely difficult to make adjustments for the desired characteristics. This is because of the inevitable variations in the many components of an FM receiver, which cause the signal meter output to vary from unit to unit. Because of the variability of the output from the signal meter, in many cases the whole unit has to be rejected because the adjustment is not possible within the adjustment range of the variable resistor R2, and this causes production problems.

Moreover, in a two-tuner diversity receiving system, in which two tuners are used, and the tuner with the higher antenna input level is selected, the following erroneous operation occurs. Namely, if the signal meter output voltages from the two tuners are different when the same antenna levels are input, although the tuner with the higher signal meter output voltage is selected, in fact this results in selecting the tuner with the lower antenna input level. Therefore, it is in fact necessary for the two tuner components when using this method to be selected to have substantially the same characteristics.

Moreover, there are also variability problems when using a seek function, which automatically scans through the broadcast frequencies and selects a station with a high receiving sensitivity. The condition for the seek is that the output from a station detector (SD) goes high. At the manufacturing stage, an operation is needed, for example using a trimmer or a variable resistor, to adjust the point at which this station detector output goes high. For example, in the manufacturing adjustment stage, a trimmer or a variable resistor may be set so that the station detector output goes high when the antenna input level is 20±3 dBµ. It is, however, very difficult to achieve this ±3 dBµ adjustment tolerance, and except for an accomplished expert this adjustment takes a long time. If, for example, the tolerance is widened to ±5 dBµ, on some units the seek will stop when the antenna input is at least 15 dBµ, while on other units the seek will stop when the antenna input is at least 25 dBµ. This results in considerable problems of variability from unit to unit.

Thus, conventionally the variability of component characteristics leads to variation in the receiving conditions of different units. Attempting to resolve this reflection of variability in components as variability in performance of the finished product by adjustment at the manufacturing stage results in extensive time requirements for the adjustment, or in a need for highly expert workers. Furthermore, the variability in components sometimes exceeds the limits of such adjustments, leading to a failure to meet the specification demanded by customers.

In view of the above, the present invention has as its objective the provision of a radio receiver which, even when there is variability in components, allows the receiving conditions to be adjusted easily or requires no adjustment, and has reduced variability among units of the receiving conditions.

Another objective of the present invention is the provision of a radio receiver which, even when there is variability in components, allows the receiving conditions to be adjusted easily, reduces the proportion of cases in which the adjustment is not possible to almost zero, and has uniform high frequency cutoff control and stereo separation control characteristics from unit to unit.

Yet another objective of the present invention is the provision of a radio receiver which, in a diversity receiving system, even if there is variability in component characteristics between tuners allows the tuner with the highest antenna input level to be selected without erroneous operation.

Yet another objective of the present invention is the provision of a radio receiver which, while allowing the conditions for a seek to stop to be adjusted easily or to require no adjustment, is able to attain uniform seek function characteristics.

Yet another objective of the present invention is the provision of a radio receiver in which component systems for automatic mono/stereo selection, automatic wide/narrow selection, and automatic high frequency cutoff ratio 0%/100% selection operate uniformly when a certain level of antenna input signal is input, regardless of variability in components.

SUMMARY OF THE INVENTION

The radio receiver of the present invention comprises a radio frequency amplifier circuit which amplifies an antenna input signal; a frequency conversion circuit which converts said amplified antenna input signal to an intermediate frequency signal; an intermediate frequency amplifier circuit which amplifies and outputs this intermediate frequency signal, and is provided with a signal meter which detects the level of said amplified intermediate frequency signal; a detector circuit which detects an AM signal or FM signal from said amplified intermediate frequency signal; a nonvolatile memory which stores the output of said signal meter, subject to component variability from unit to unit, when a predetermined reference level of said antenna input signal is input in an adjustment stage of manufacture, as a reference voltage value; and a control means which, based on said signal meter output reference voltage value stored in said nonvolatile memory, sets and controls receiving conditions when different levels of said antenna input signal are input in such a way as to be appropriate to said different levels of said antenna input signal with low variability from unit to unit.

According to the present invention, in an adjustment stage of manufacture, a signal meter output when an antenna input signal of a reference level is input is stored in nonvolatile memory as a reference voltage value. This reference value is affected by the variability in electrical characteristics of the various components of the radio receiver, and varies from unit to unit.

When an arbitrary level of antenna input signal is actually input to the radio receiver, the corresponding signal meter output is detected, and by comparing it with the reference value stored in nonvolatile memory, the real antenna input signal level can be determined. Therefore, the receiving conditions can be set according to the antenna input level in a uniform way, even when there is variability in the electrical characteristics of the various components of the radio receiver which thus vary from unit to unit.

As receiving conditions can be cited varying characteristics for the subsidiary signal demodulation level for AM stereo and FM stereo.

In this case, said control means may include a stereo separation control voltage generating means, which, based on said signal meter output reference voltage value stored in said nonvolatile memory, computes a correction to said signal meter output corresponding to the actually input antenna input level and generates said stereo separation control voltage.

In another aspect of the invention, in said nonvolatile memory is further stored a stereo separation control reference voltage value for setting a subsidiary signal demodulation level appropriate to the antenna input signal when an antenna input signal of said reference level is input. In this case, said stereo separation control voltage generating means, based on said signal meter output reference voltage value and said stereo separation control reference voltage value stored in said nonvolatile memory, computes a correction to said signal meter output corresponding to the actually input antenna input level and generates the stereo separation control voltage.

In yet another aspect of the invention, in said nonvolatile memory can be stored a plurality of signal meter output reference voltage values measured respectively when an antenna input level corresponding to a monaural point with a subsidiary signal demodulation level of 0% and one or a plurality of antenna input levels corresponding to a stereo separation variation region in which the antenna input level is higher than at said monaural point are input, and respective stereo separation control reference voltage values to obtain stereo separation characteristics corresponding to this plurality of signal meter output reference voltage levels. In this case, said stereo separation control voltage generating means, based on said plurality of signal meter output reference voltage values and stereo separation control reference voltage values, when an antenna input signal of any level is input computes a stereo separation control voltage corresponding to said antenna input signal level by linear interpolation.

As receiving conditions can be cited varying characteristics for the high frequency cutoff ratio for a weak broadcast signal for AM and FM reception.

In this case, said control means includes a high frequency cutoff control voltage generating means which, based on said signal meter output reference voltage value stored in said nonvolatile memory, computes a correction to said signal meter output corresponding to the actually input antenna input level and generates the high frequency cutoff control voltage.

In another aspect of the invention, in said nonvolatile memory is further stored a high frequency cutoff control reference voltage value for setting a high frequency cutoff ratio appropriate to the antenna input signal when an antenna input signal of said reference level is input. In this case, said high frequency cutoff control voltage generating means, based on said signal meter output reference voltage value and said high frequency cutoff control reference voltage value stored in said nonvolatile memory, computes a correction to said signal meter output corresponding to the actually input antenna input level and generates the high frequency cutoff control voltage.

In yet another aspect of the invention, said nonvolatile memory stores a plurality of signal meter output reference voltage values measured respectively when an antenna input level corresponding to a monaural point with a subsidiary signal demodulation level of 0% and one or a plurality of antenna input levels corresponding to a high frequency cutoff region in which the antenna input level is lower than at said monaural point are input, and respective high frequency cutoff control reference voltage values to obtain high frequency cutoff characteristics corresponding to this plurality of signal meter output reference voltage levels. In this case, said high frequency cutoff control voltage generating means, based on said plurality of signal meter output reference voltage values and high frequency cutoff control reference voltage values, when an antenna input signal of any level is input computes a high frequency cutoff control voltage corresponding to said antenna input signal level by linear interpolation.

In yet another aspect, the invention can be applied to a radio receiver having a high frequency cutoff circuit which reduces the high frequency components in said composite signal at a high frequency cutoff ratio of selectively two values, 0% or 100%. In this case, in said nonvolatile memory is further stored the output of said signal meter when an antenna input signal corresponding to a weak broadcast signal is input, as a reference voltage value, and when a comparator detects said signal meter output to be lower than said signal meter output reference voltage value, said control means outputs the high frequency cutoff control voltage to set said high frequency cutoff ratio to 100%.

As receiving conditions can be cited sensitivity conditions for which, on carrying out an automatic scan of receiving frequencies, the scan is ceased at a frequency of high sensitivity.

In this case, said intermediate frequency amplifier circuit is provided with a station detector which, based on said signal meter output, outputs a station detection signal. Furthermore, said nonvolatile memory stores said signal meter output when an antenna input signal is input of a level close to or greater than or equal to the upper limit of a predetermined range determined such that said station detection signal is output from the station detector, as said reference voltage value. Yet further, said control means includes a seek control means which carries out an automatic scan of receiving frequencies, and causes a stop to the scan at a frequency of high sensitivity. This seek control means is constructed to include: an intermediate frequency counter which counts the output from said buffer for counting said intermediate frequency When said station detection signal is input from said station detector; and a comparator which compares said signal meter output reference voltage level stored in said nonvolatile memory with said signal meter output when said antenna input signal is input at an arbitrary level. Moreover, this seek control means, when said intermediate frequency counter counts a predetermined intermediate frequency and said comparator detects said signal meter output to be higher than said signal meter output reference voltage level, stops said automatic scan.

As receiving conditions can be cited sensitivity conditions for switching automatically according to the antenna input level between a wide mode for high fidelity reception and a narrow mode for high selectivity reception.

In this case, in said nonvolatile memory is stored the signal meter output when an antenna input signal corresponding to a strong broadcast signal is input, as a reference voltage value. Moreover, said control means includes a second mode setting means which controls the enablement of a high bandwidth receiving mode (wide mode) for high fidelity or a low bandwidth receiving mode (narrow mode) for high selectivity. This second mode setting means has a comparator which compares said signal meter output reference voltage level stored in said nonvolatile memory with said signal meter output when said antenna input signal is input at an arbitrary level, and when said comparator detects said signal meter output to be higher than said signal meter output reference voltage level, controls the enablement of said high bandwidth receiving mode.

As receiving conditions can be cited sensitivity conditions for automatic mono/stereo switching. In this case, in said nonvolatile memory is stored the output of said signal meter when an antenna input signal corresponding to a monaural point is input, as a reference voltage value. Moreover, said control means includes a comparator which compares said signal meter output reference voltage level stored in said nonvolatile memory with said signal meter output when said antenna input signal is input at an arbitrary level, and when said comparator detects said signal meter output to be higher than said signal meter output reference voltage level, outputs said stereo separation control voltage to set said subsidiary signal demodulation level to 100%.

The present invention can further be applied to a radio receiver employing the diversity reception method, selecting with a first switch a tuner for reception from a plurality of tuners, each comprising a receiving circuit including elements from an antenna to a detector circuit. In this case, said nonvolatile memory stores the output of said signal meter, subject to variability from tuner to tuner, when a predetermined reference level of said antenna input signal is input in an adjustment stage of manufacture, for each of said tuners as corresponding reference voltage values. Moreover, said control means includes: a calculation means which, based on said signal meter output reference voltage values stored in said nonvolatile memory, computes a correction to said signal meter output from each of said tuners corresponding to arbitrary levels of said antenna input signals, to compute accurate level comparison values for said antenna input signal levels, and a comparator for comparing said level comparison values for each of said tuners; and controls the operation of said first switch to select the tuner for which said level comparison value is highest.

DETAILED DESCRIPTION OF THE PREFERRED EMBODIMENTS

The present invention is now described in terms of a number of preferred embodiments, with reference to the drawings.

First Embodiment

Figure 2:
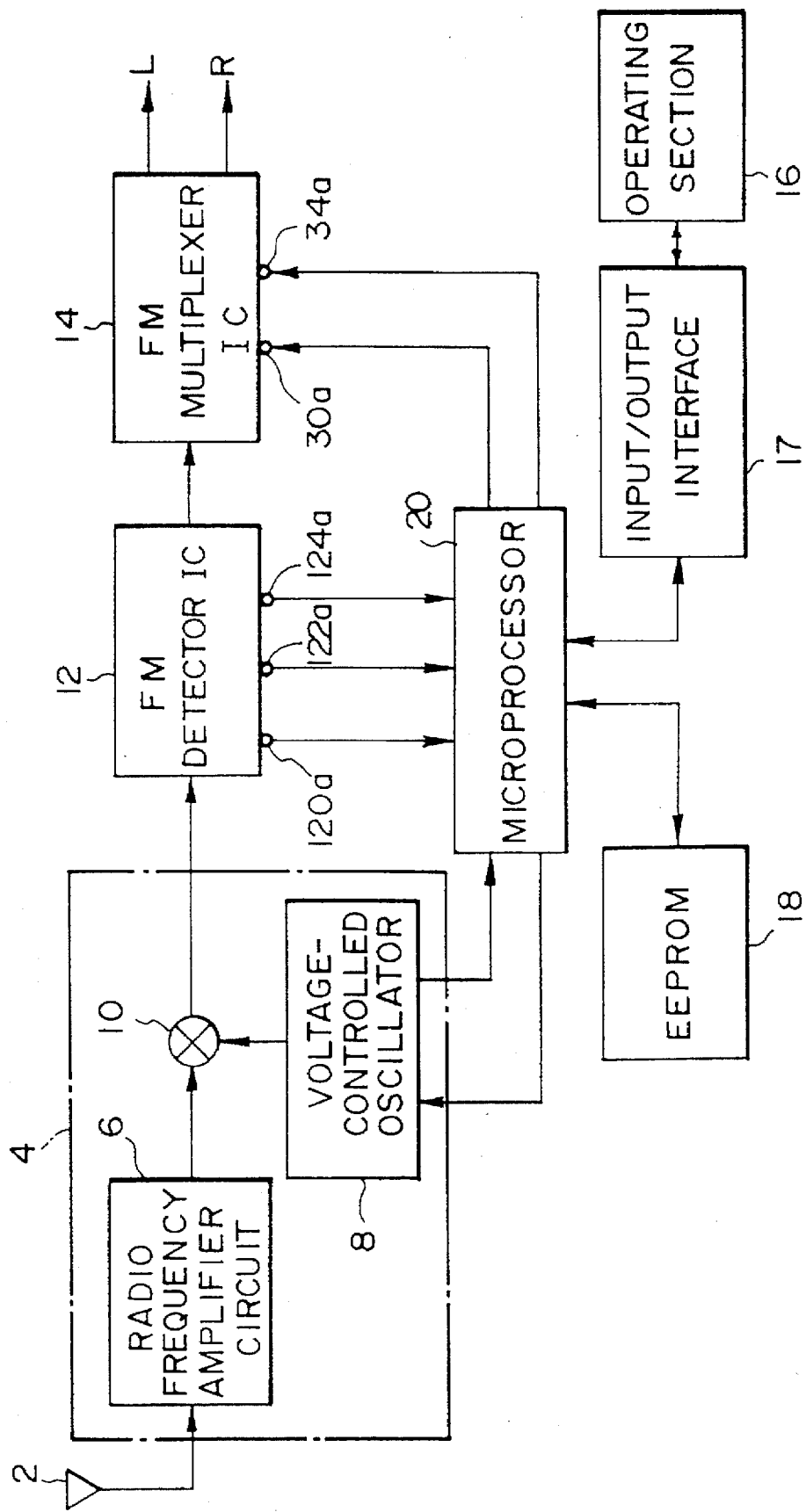
FIG. 2 is a block diagram of the overall construction of one embodiment of the present invention.

FIG. 2 illustrates the overall construction of one embodiment of the present invention applied to an FM receiver. A radio frequency signal is input from an antenna 2 to an FM front end 4. This FM front end 4 comprises a radio frequency amplifier circuit 6, a voltage-controlled oscillator (VCO) 8, and a frequency mixer circuit 10, and converts the radio frequency signal to an intermediate frequency signal. The voltage-controlled oscillator 8 and frequency mixer circuit 10 together constitute a frequency conversion circuit. The output of the FM front end 4 is input to an FM detector IC 12, which functions as an intermediate frequency amplifier and FM detector. The composite signal resulting from this FM detection includes a principal signal corresponding to the sum of the two channels (L+R), a subsidiary signal amplitude modulated at 38 kHz corresponding to the difference (L−R), and a pilot signal. This composite signal is input to an FM multiplexer IC 14, which acts as a stereo demodulation circuit, and signals for the left and right channels are regenerated. This FM multiplexer IC 14 has an HCC pin 30a and an SPC pin 34a.

From a first pin 120a on the FM detector IC 12 is output a signal meter output voltage, and this signal meter output voltage is input to a microprocessor 20.

The characteristics of this signal meter output voltage are subject to variability from unit to unit, because of the variability of component parts.

The microprocessor 20 corrects this variability in the signal meter output voltage, and computes SPC and HCC voltages which depend on the antenna input level in a way which does not vary from unit to unit; these voltages are then applied to the HCC pin 30a and SPC pin 34a of the FM multiplexer IC 14. It should be noted that the second and third pins 122a and 124a of the FM detector IC 12 will be described below.

The FM multiplexer IC 14 and microprocessor 20 will now be described with reference to FIG. 1.

Figure 9:
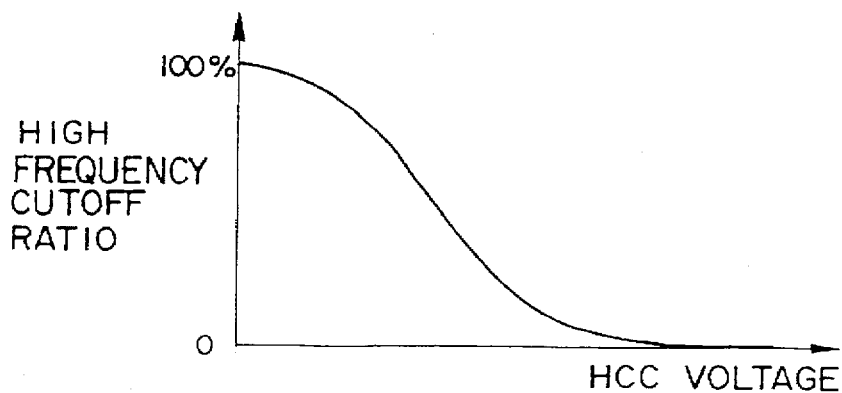
FIG. 9 is a characteristics graph showing the relationship between a high frequency cutoff control voltage and a high frequency cutoff ratio.

The FM multiplexer IC 14 has as its principal components a high frequency cutoff circuit 30, a principal signal demodulation circuit 32, a subsidiary signal demodulation circuit 34, a matrix circuit 36 and a phase-looked loop 38, The high frequency cutoff circuit 30 eliminates high-frequencies, that is to say, FM noise present in a weak composite signal, for example in a band from 7 kHz upward, based on the input voltage to the HCC pin 30a, at a cutoff ratio derived in a predetermined way from the antenna input level. The relation between the HCC voltage and the cutoff ratio is shown in FIG. 9, and the cutoff ratio is higher when the HCC voltage is lower.

Figure 8:
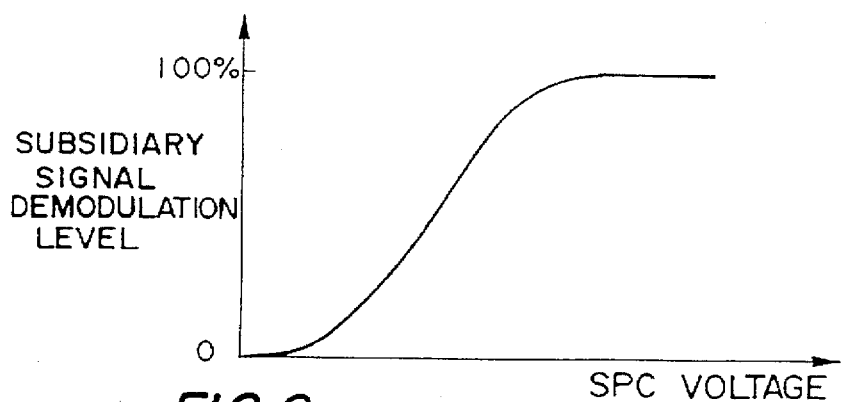
FIG. 8 is a characteristics graph showing the relationship between a stereo separation control voltage and a subsidiary signal demodulation level.

The principal signal demodulation circuit 32 and subsidiary signal demodulation circuit 34 respectively demodulate the principal signal and subsidiary signal in the composite signal. In particular, the subsidiary signal demodulation circuit 34 also has a stereo separation control function, which varies the demodulation level of the subsidiary signal from 0 to 100%, based on the input voltage to the SPC pin 34a, according to predetermined characteristics depending on the antenna input level. The relationship between the SPC voltage and subsidiary signal demodulation level is shown in FIG. 8. As will be seen from the figure, the subsidiary signal demodulation level approaches 100% as the SPC voltage increases.

Based on the signals output from the principal and subsidiary signal demodulation circuits 32 and 34, the matrix circuit 36 uses the computation:

$$(L-R)+(L+R)=2L$$
$$(R-L)+(L+R)=2R$$

to regenerate the left and right channel signals. In this regeneration, the necessary 38 kHz signal is obtained from the composite signal through the phase-locked loop 38.

Figure 7:
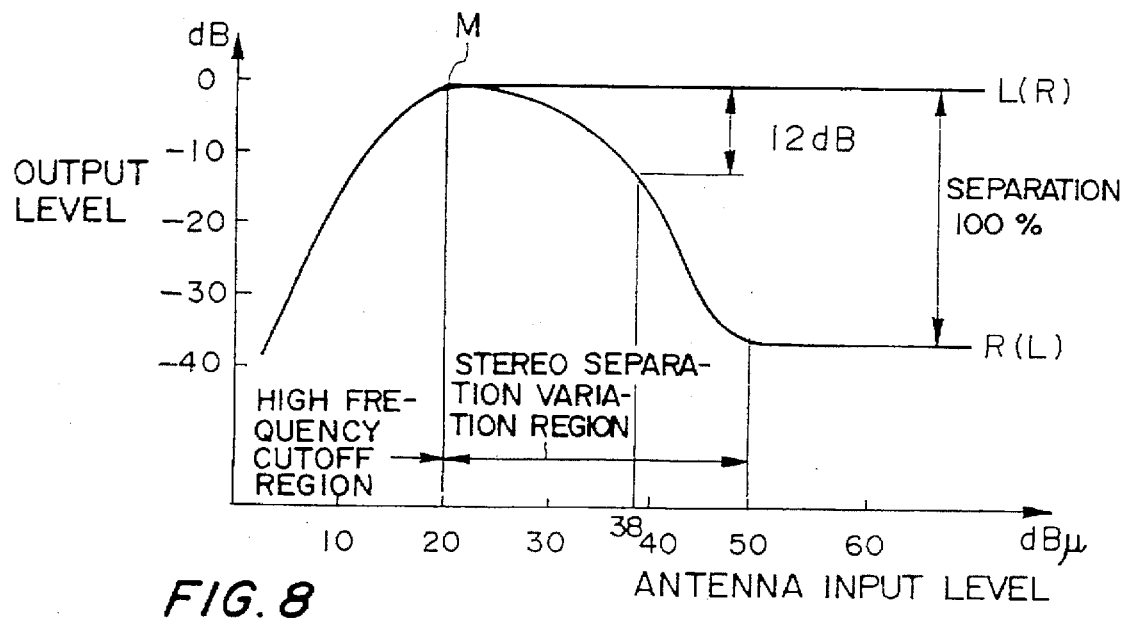
FIG. 7 is a characteristics graph showing the relationship between an antenna input level and an output level.

The output level (dB) of the matrix circuit 36 when the antenna input level (dBµ) from the antenna 2 varies is shown in FIG. 7. As shown in this figure, if the antenna input level is for example 20 dBµ, this is the monaural point M at which the separation is 0%, and as the input level increases from the monaural point M there is a separation variation region in which the separation (%) increases, and when the broadcast signal is strong the separation reaches 100%. On the other hand, in the region where the broadcast signal becomes weaker from the monaural point M, there is a high frequency cutoff region in which the characteristic FM noise is smoothly attenuated. The high frequency cutoff region may be extended to include input level values higher than the monaural point M.

To obtain the high frequency cutoff characteristics and stereo separation control characteristics shown in FIG. 7, it is necessary for SPC and HCC voltages as shown in FIGS. 8 and 9 to be applied to the pins 30a and 34a. The relation between the SPC voltage shown in FIG. 8 and the antenna input level is shown by the solid line S1 in FIG. 10. As shown by the solid line S1 in this figure, when the antenna input level is 20 dBµ, the SPC voltage is b1, and by the application of this SPC voltage b1 the characteristics of the monaural point M in FIG. 7 are obtained. Similarly, when the antenna input level is 38 dBµ, the SPC voltage is a1, and by the application of this SPC voltage a1 a stereo separation of −12 dB is obtained as shown in FIG. 7.

Figure 4:
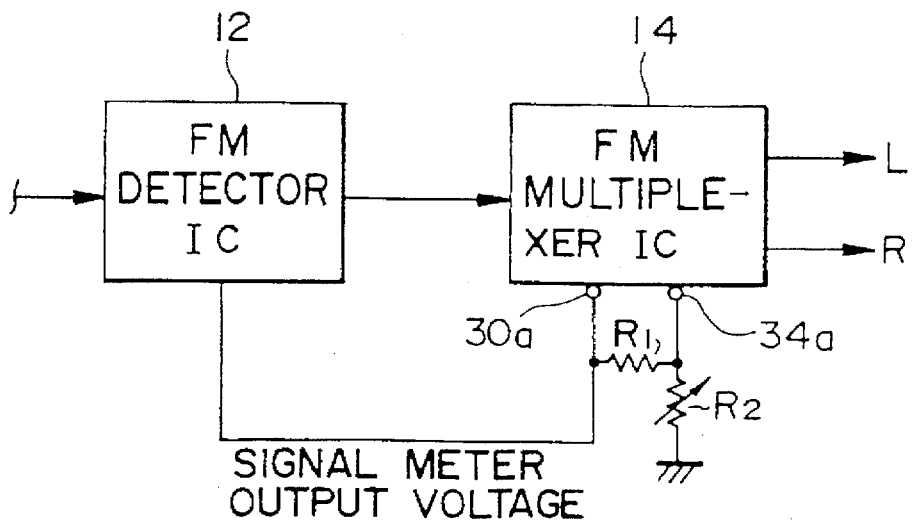
FIG. 4 is a schematic block diagram showing the application of voltages to an SPC pin and an HCC pin in a conventional device.

In a conventional device, meanwhile, as shown in FIG. 4, the signal meter output voltage from the FM detector IC 12 is used to provide SPC and HCC voltages by means of a voltage splitter formed by resistors R1 and R2.

The signal meter output voltage varies from unit to unit independent of a constant antenna input level, because of the variability of the components making up the FM receiver. For example, as shown by the broken lines S2 and S3 in FIG. 10, the signal meter output voltage as a function of the antenna input level is different for different units. For example, the characteristics shown by broken line S2 show a signal meter output voltage b2 (>b1) when the antenna input level is 20 dBµ, and a signal meter output voltage a2 (>a1) when the antenna input level is 38 dBµ. Therefore, a unit with the characteristics of broken line S2 in FIG. 10 must have the altered characteristics shown by the broken (dot-dot-dash) line T2 in FIG. 11, or it will not be possible to attain the monaural point M with a stereo separation of 0% when the antenna input level is 20 dBµ.

Figure 10:
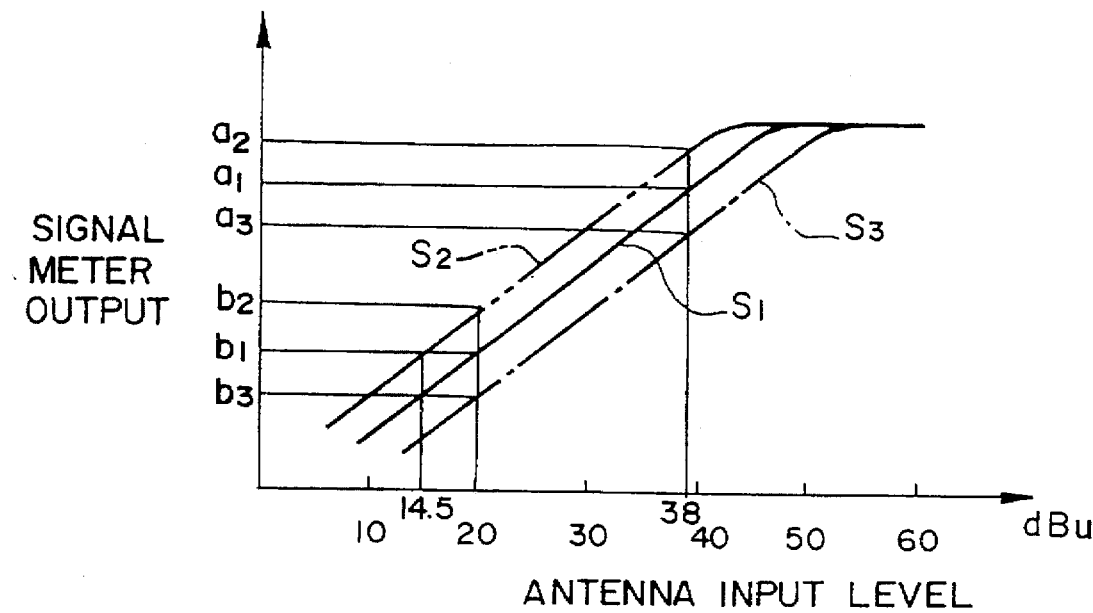
FIG. 10 is a characteristics graph showing variability of a signal meter output voltage against an antenna input level.
Figure 11:
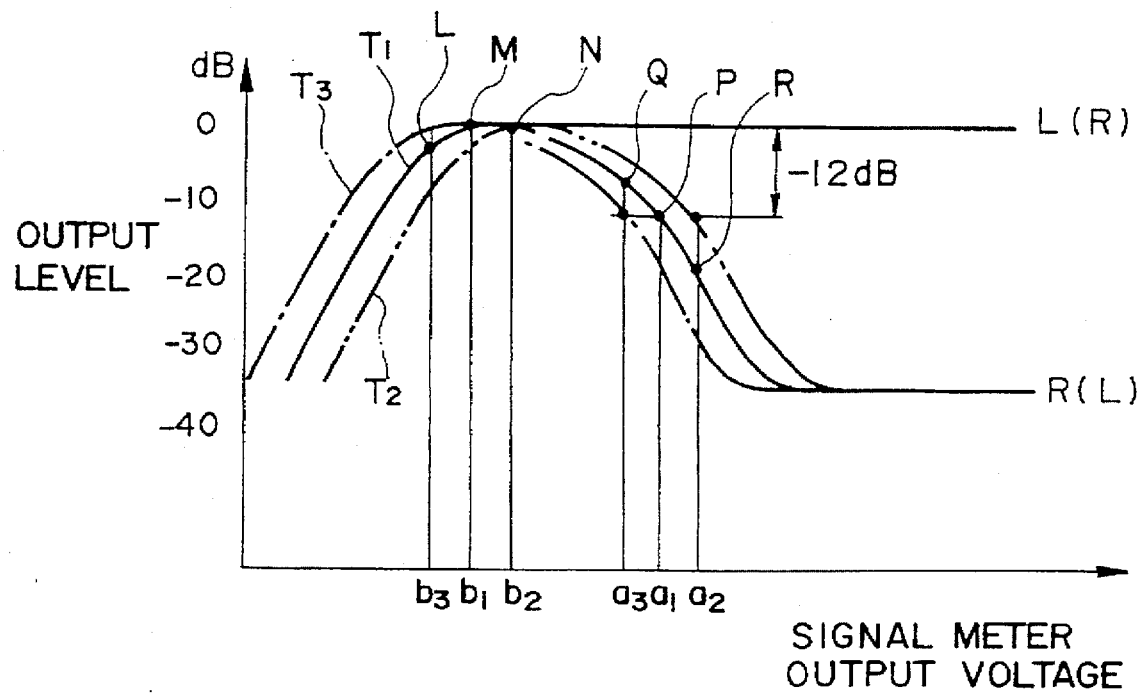
FIG. 11 is a characteristics graph showing the relationship between signal meter output voltages for different units and output levels.

The FM multiplexer IC 14 has characteristic T1 in FIG. 11, corresponding to the characteristic S1 shown in FIG. 10. As a result, when the antenna input level is 20 dBµ, if the signal meter output voltage b2 of the characteristic S2 is used as the SPC voltage, a characteristic N is obtained which has the stereo separation more advanced than the monaural point M. This means that separation is applied to a signal which is not strong enough to support stereo separation, and as a result the S/N ratio is decreased.

On the other hand, for the characteristic S3 in FIG. 10, because of the voltage b3 applied when the antenna input level is 20 dBµ, high frequency cutoff is applied at a ratio L lower than the monaural point M. Similarly, when the antenna input level is 38 dBµ, whereas basically a characteristic P of −12 dB should be obtained, in the case of characteristic S2 in FIG. 10 the characteristic of point R with an increased stereo separation (%) is obtained, and in the case of characteristic S3 in FIG. 10 the characteristic of point Q with a stereo separation (%) reduced from that of point P is obtained.

In this embodiment, to prevent the above problems, the microprocessor 20 which inputs the signal meter output voltage corrects this signal meter output voltage and outputs appropriate control voltages to the HCC pin 30a and SPC pin 34a. This microprocessor 20 comprises an A/D converter 22, a calculation unit 24, and a D/A converter 26. The microprocessor 20 is also connected to a nonvolatile memory such as an EEPROM 18. The microprocessor 20 is also connected through an input/output interface 17 to an operating section 16. The calculation unit 24 inputs the signal meter output voltage in digital form, and based on data stored in the EEPROM 18 computes and outputs an appropriate HCC voltage and SPC voltage.

Next, the data stored in the EEPROM 18 is described.

At the stage of adjustment before the FM receiver is shipped from the factory, an antenna input signal is input from a signal generator to the antenna 2, with an input level of for example 20 dBµ. At this point the signal meter output voltage is input to the microprocessor 20 from the FM detector IC 12, and the calculation unit 24 stores this signal meter output voltage in the EEPROM 18. The signal meter output voltage stored in memory is b2 in the case of characteristic S2 in FIG. 10 and b3 in the case of characteristic S3. Moreover, when an antenna input level of 20 dBµ is input an external adjustment voltage is applied to the SPC pin 34a, and the adjustment voltage when this stereo separation of 0% is achieved is stored in the EEPROM 18. In the case of both characteristic S2 and characteristic S3 in FIG. 10, this adjustment voltage is b1. In a similar way, the signal meter output voltage (a2 in the case of characteristic S2, or a3 in the case of characteristic S3) when the antenna input level is 38 dBµ, and the adjustment voltage to obtain a level separation between the left and right channel signals of −12 dB (a1 for both of characteristics S2 and S3) are stored in the EEPROM 18.

Figure 12:
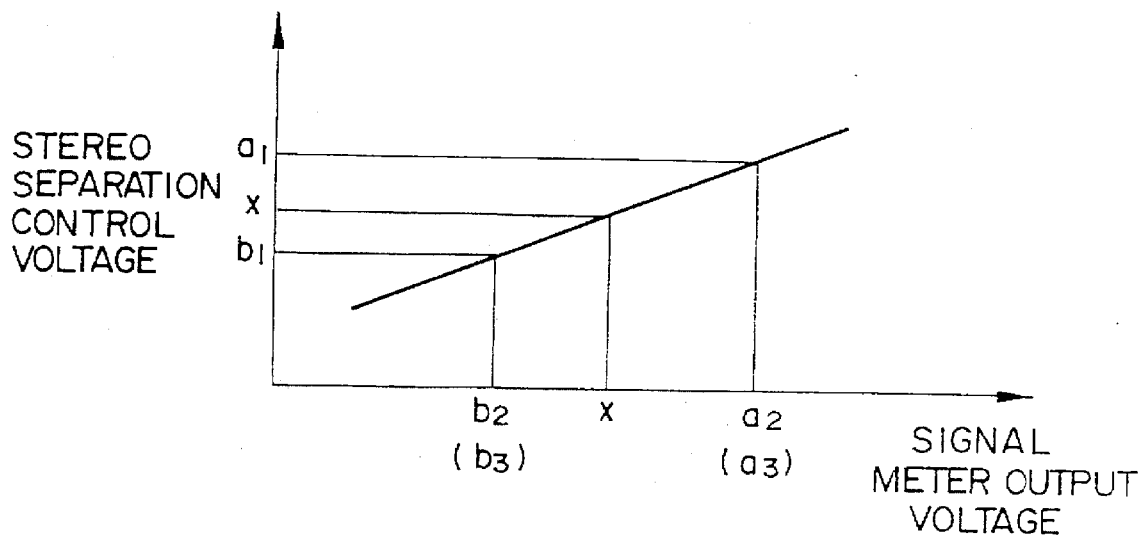
FIG. 12 is a schematic diagram illustrating the principle for linear interpolation of the stereo separation control voltage from the signal meter output voltage.

Thereafter, when an arbitrary signal meter output voltage X is input to the microprocessor 20, the computation of the SPC voltage x is carried out by the calculation unit 24 based on the data stored in the EEPROM 18, according to the expression below. For example, taking characteristic S2 in FIG. 11 as an example:

$$x = a1 - \alpha(a2 - X)$$

where $\alpha$ is the gradient of the solid line in FIG. 12 given by:

$$\alpha = (a1 - b1)/(a2 - b2)$$

It may be sufficient to store the gradient $\alpha$ and voltages a1 and a2 in the EEPROM 18.

The reason for using the above linear interpolation calculation to derive the SPC voltage x from the signal meter output voltage X in this way, is that the signal meter output voltages S2 and S3 produced by particular devices may not be parallel to the reference characteristic S1 shown in FIG. 10, or may not be completely linear, having superimposed undulations. In place of this linear interpolation, in cases where the characteristics S2 and S3 can approximated as parallel to the basic characteristic S1, it may be satisfactory to store in memory only the signal meter output voltage and corresponding SPC voltage at a single point, such as for 20 dBµ, and to correct the characteristics S2 and S3 to S1 by a simple shift.

Figure 3:
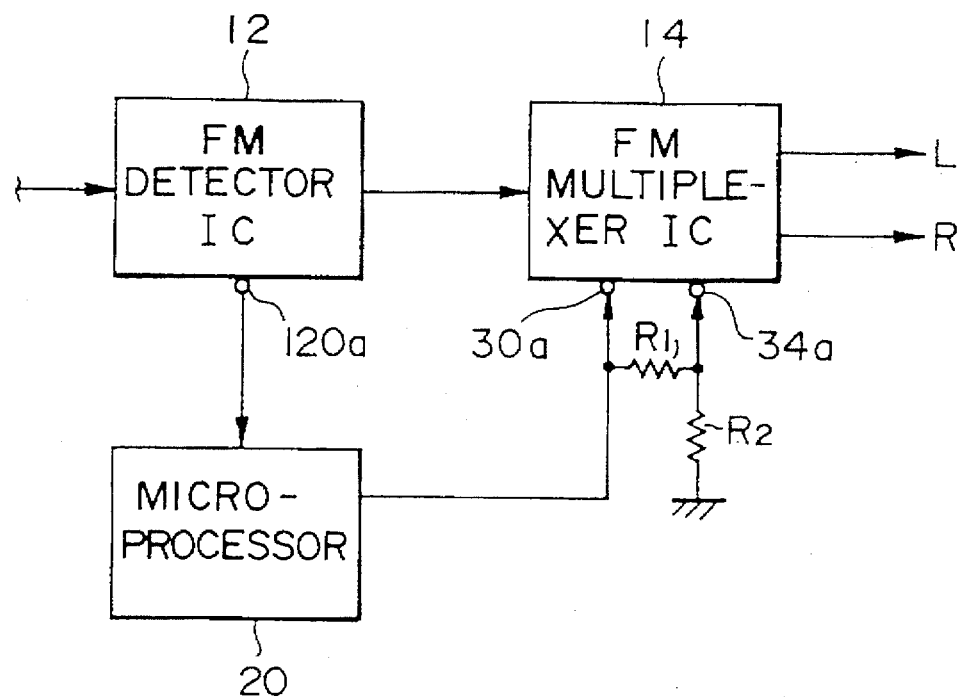
FIG. 3 is a schematic block diagram showing a variant method of obtaining an HCC voltage and an SPC voltage by means of a voltage divider.

The HCC voltage may be determined in a similar way, but since there is a fixed correlation between the SPC voltage and HCC voltage, as shown in FIG. 3 for example, the control voltage output from the microprocessor 20 may be divided by resistor R1 and resistor R2 to provide the required HCC voltage and SPC voltage. By using such voltage division resistors, it may be sufficient to carry out a correction calculation for only one of the SPC voltage and HCC voltage from the signal meter output voltage.

Thus in this embodiment, even if there is variability in components from one unit to another, the varying signal meter output voltage can be converted by calculation to a control voltage corresponding to the antenna input level with no variability, and it is possible always to obtain the high frequency cutoff and stereo separation characteristics with respect to the antenna input level as shown in FIG. 7. In particular, the troublesome work of adjusting a variable resistor in a conventional system is reduced, and a unit which would have had to be rejected because a large deviation in a component made the adjustment impossible within the adjustment range of the variable resistor can easily be made good, which increases the yield. It should also be noted that the first embodiment may also be applied to an AM stereo receiver.

Second Embodiment

Next an embodiment of the present invention applied to a two-tuner diversity receiving method is described with reference to FIGS. 5 and 6. The device of this embodiment has two tuners 40 and 42, having respective separate components from the antennas to the FM detector ICs, a first switch 44 switching selectively the outputs of the first and second FM detectors 12a and 12b of the tuners 40 and 42, an FM multiplexer IC 14 receiving the FM detector output and regenerating the left and right channel signals, and a microprocessor 50 receiving the signal meter output voltages from the first and second FM detectors IC 12a and 12b, and applying an HCC voltage and SPC voltage to pins 30a and 34a of the FM multiplexer IC 14 appropriately depending on the tuners 40 and 42.

Figure 6:
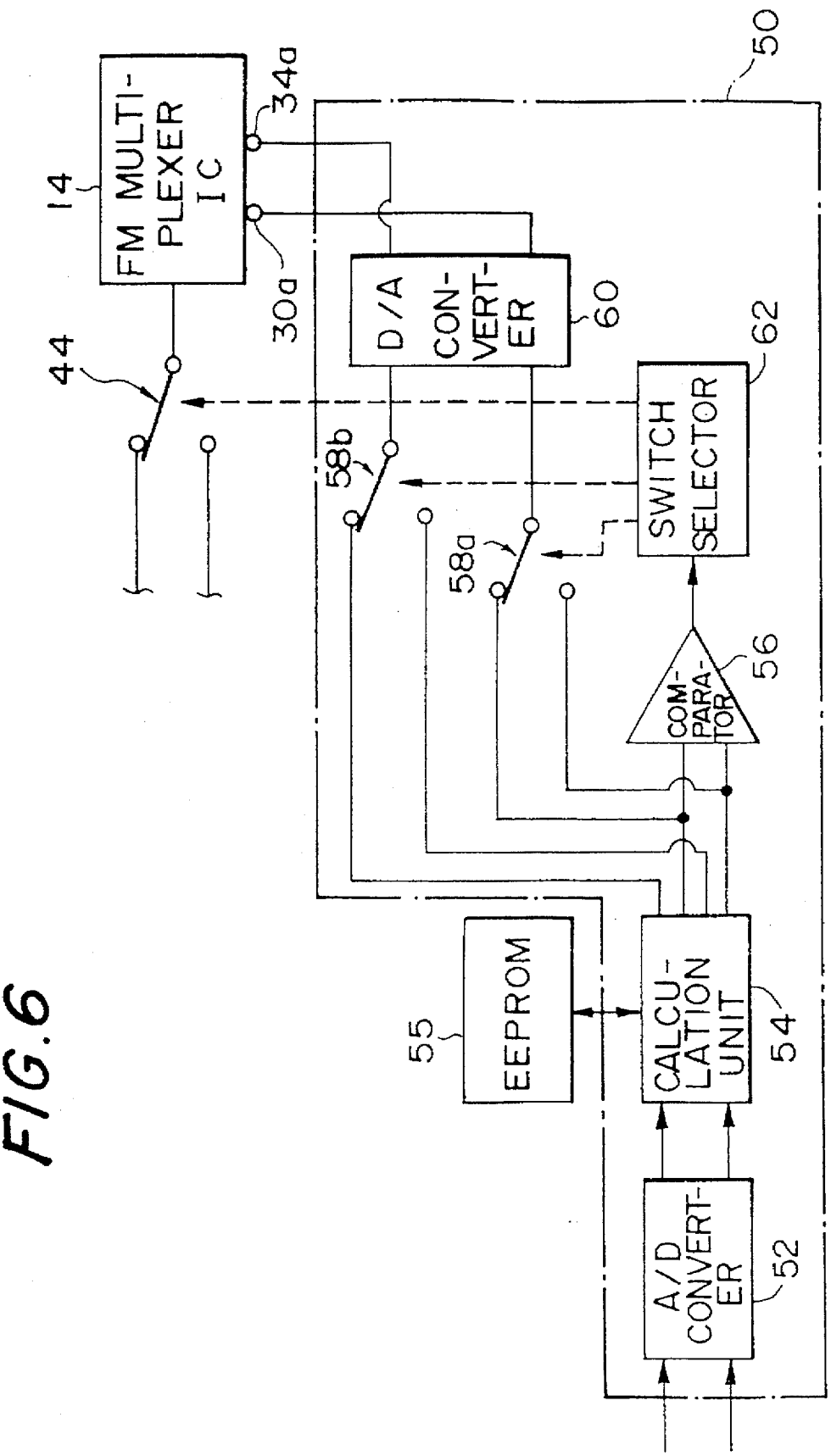
FIG. 6 is a block diagram showing details of the microprocessor 50 in FIG. 5.

The construction of the microprocessor 50 is shown in FIG. 6. This microprocessor 50 comprises an A/D converter 52, a calculation unit 54, a comparator 56, second and third switches 58a and 58b, a D/A converter 60, and a switch selector 62. The microprocessor 50 is connected to an EEPROM 55. The EEPROM 55 stores the same data for the two tuners 40 and 42 as the EEPROM 18 in FIG. 1. The calculation unit 54 receives the signal meter output voltages for the two tuners through the A/D converter 52, and based on data stored in the EEPROM 55 computes and outputs appropriate respective HCC voltages and SPC voltages for the two tuners 40 and 42. The comparator 56 compares the corresponding levels, for example the SPC voltages, output from the calculation unit 54 for the two tuners. The second and third switches 58a and 58b selectively output the HCC voltage and SPC voltage for one only of the two tuners 40 and 42, and whichever of these voltages are passed through the D/A converter 60 and applied to the pins 30a and 34a of the FM multiplexer IC 14.

The switch selector 62, based on the output from the comparator 56, selects whichever of the tuners 40 and 42 has the higher SPC voltage, by controlling the first switch 44 and second and third switches 58a and 58b appropriately.

In this embodiment, even if for example the one tuner 40 has the characteristic S2 of FIG. 10 for the signal meter output voltage characteristic, while the other tuner has the characteristic S3, the SPC voltages for the tuners 40 and 42 output by the calculation unit 54 of the microprocessor 50 are corrected to the characteristic S1 shown in FIG. 10 to be output. Therefore, if the SPC voltages of the tuners 40 and 42 are the same, it implies that both receive signals of the same antenna input level, or in other words if the SPC voltage for one tuner is higher it implies that the antenna input level to that tuner is higher. The comparator 56 is therefore able, by detecting which of the tuners 40 and 42 has a higher SPC voltage, and controlling the first to third switches 44, 58a and 58b through the switch selector 62 based on that result, to select always the tuner which has the higher antenna input level. Moreover, since the SPC voltage and HCC voltage applied to the pins 30a and 34a of the FM multiplexer IC 14 are corrected to be independent of any variability between the tuners 40 and 42, change in signal strength given when switching between the tuners is greatly reduced.

In a conventional two-tuner diversity receiving method, the signal meter output voltages from the tuners 40 and 42 are input directly to the comparator 56. The tuners are then switched so that the tuner with the higher signal meter output voltage is selected.

In this case, if for example the characteristics of the tuner 40 are as S2 in FIG. 10, and the characteristics of the tuner 42 are as S3 in FIG. 10, then supposing that the signal meter output voltage of the tuner 40 is b1 and the signal meter output voltage of the tuner 42 is b3, then since b1 >b3 the comparator selects the tuner 40.

However, when the signal meter output voltage is b1, the antenna input level to the tuner 40 is 14.5 dBµ, and when the signal meter output voltage is b3, the antenna input level to the tuner 42 is 20 dBµ which is higher, regardless of which the tuner with the lower signal strength will be erroneously selected. This results in an unpleasant sound for the listener.

In regard to these points, the embodiment described above will not carry out an erroneous selection of the tuner with a lower antenna input signal level, and moreover eliminates unpleasant sounds which would otherwise be generated when the tuners are switched. This second embodiment may also be applied to an AM stereo receiver.

Figure 1:
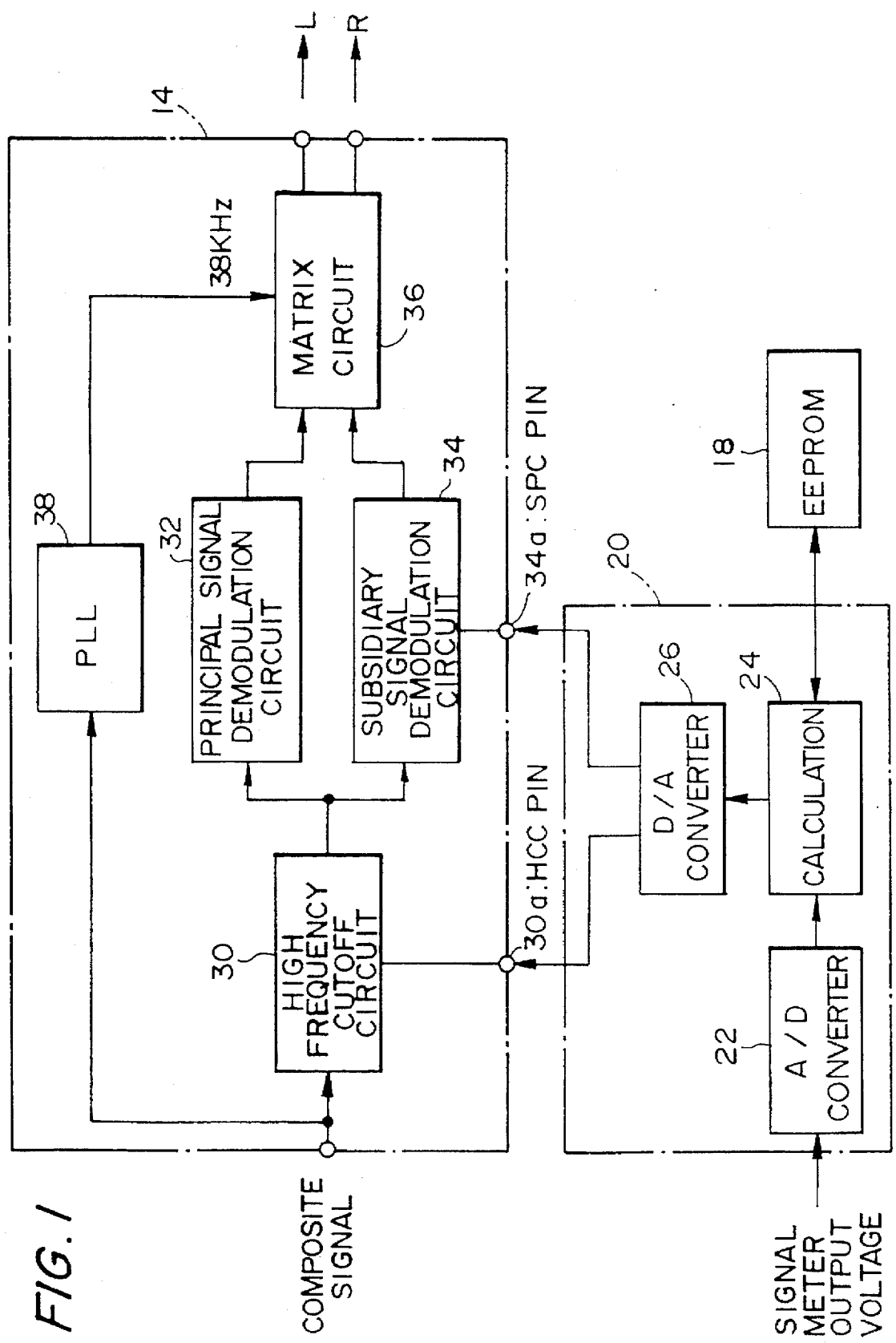
FIG. 1 is a block diagram of the FM multiplexer IC and microprocessor of one embodiment of the present invention.
Figure 13:
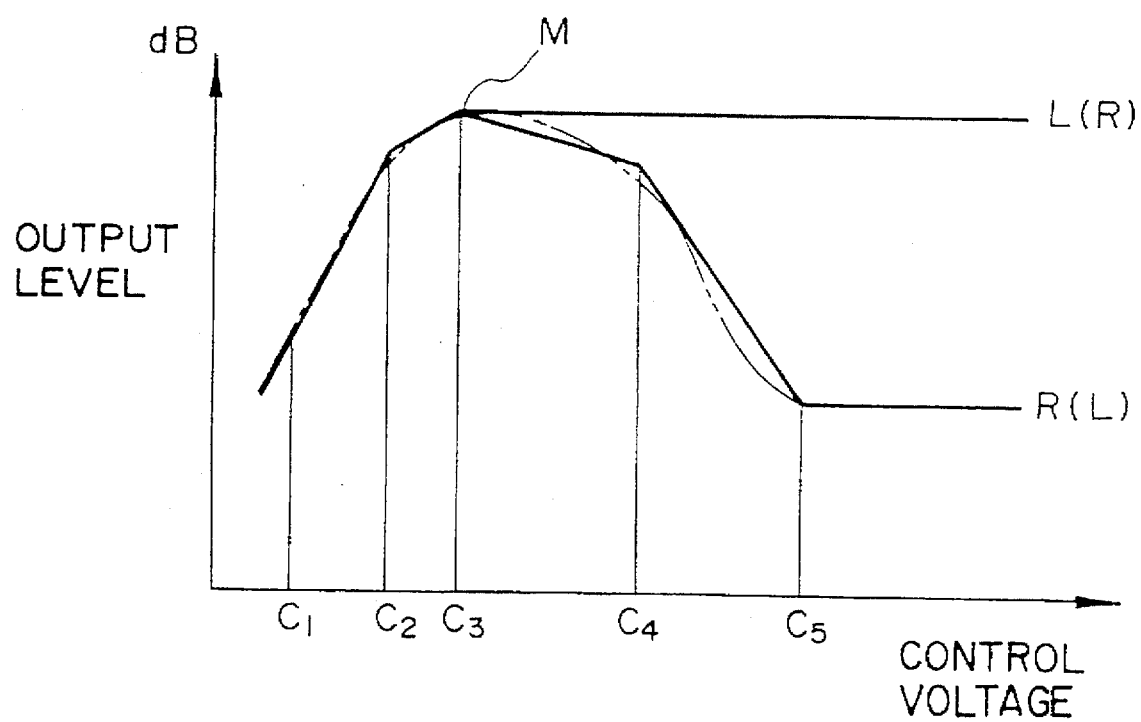
FIG. 13 is a graph showing the result of linear interpolation of the high frequency cutoff ratio and stereo separation characteristics.

FIG. 13 is a graph showing characteristics when in the high frequency cutoff circuit 30 shown in FIG. 1, based on a control voltage to be input, the high frequency band of the composite signal is reduced at a high frequency cutoff ratio which varies linearly, and also based on a control voltage to be input, the demodulation level of the subsidiary signal in the subsidiary signal demodulator 34 is varied from 0 to 100% according to separation characteristics which vary linearly.

In the embodiment shown in this figure, the control voltages c1 to c5 for example in FIG. 13 are found by adjustment in the same way as for the embodiment shown in FIG. 1, and these are stored in the EEPROM 18 shown in FIG. 1. Furthermore, at the time of this adjustment, the signal meter output voltages when predetermined antenna input levels are supplied from a signal generator are similarly stored in the EEPROM 18.

Next, based on these data, when voltages other than the signal meter output voltages corresponding to these control voltages c1 to c5, are passed through the A/D converter 22 and read into the calculation unit 24, the calculation unit 24 carries out a linear interpolation in the same way as in FIG. 12 to compute the control voltage corresponding to arbitrary signal meter output voltage.

It should be noted that in the case shown in FIG. 13 the high frequency cutoff region and stereo separation region on either side of the monaural point M are each represented by two straight line segments of different gradients for the high frequency cutoff ratio or stereo separation characteristics, but in each case could equally well be used a single straight line segment or three or more straight line segments. In any case, based on the data stored in the EEPROM 18, when any signal meter output voltage is input, the control voltage can be found by linear interpolation. Furthermore, with regard to points other than the monaural point M, it is sufficient to store the control voltage corresponding to at least two points on each straight line segment of a different gradient.

Figure 5:
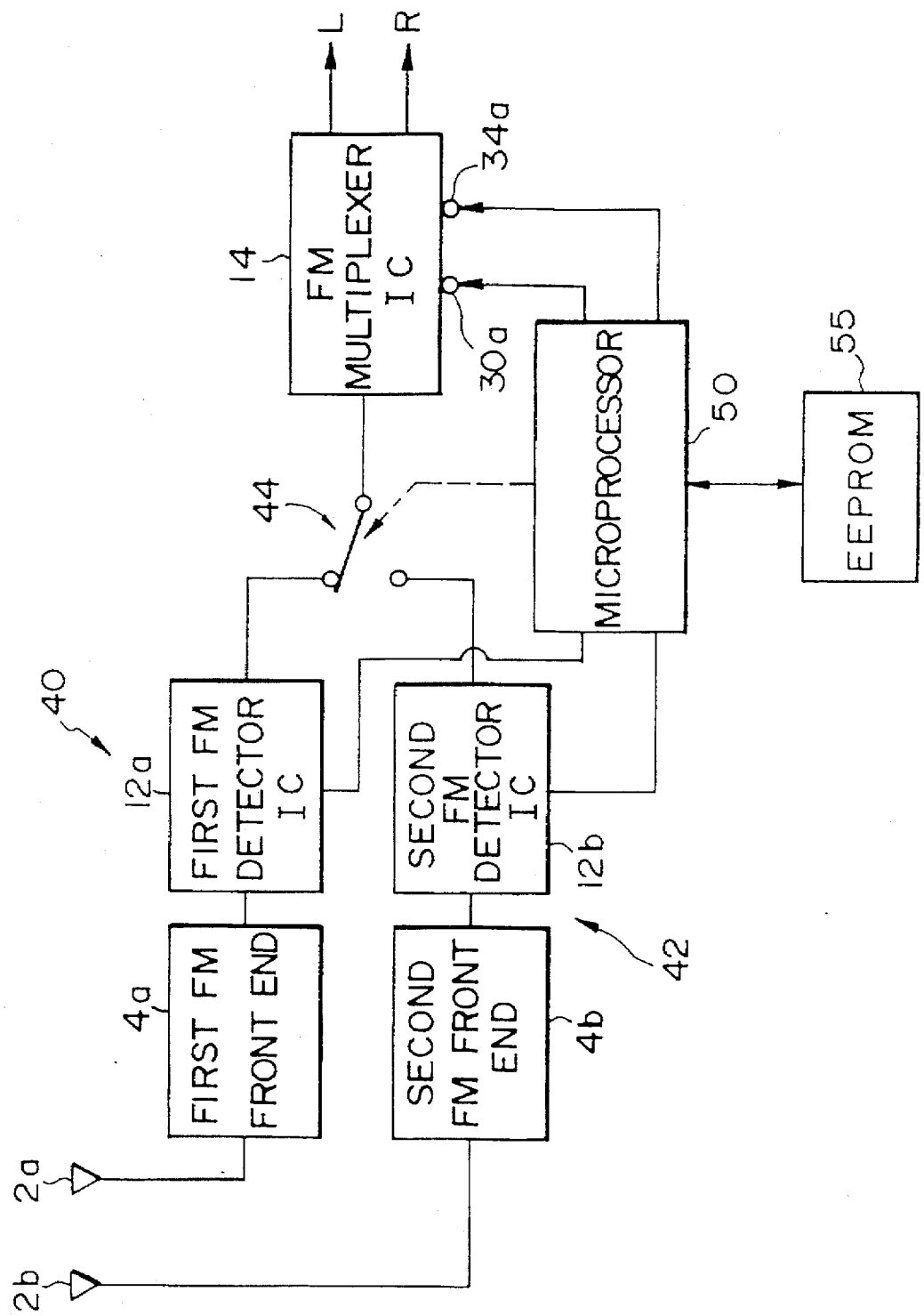
FIG. 5 is a block diagram of the overall construction of an embodiment of the present invention applied to the two-tuner diversity receiving method.

Moreover, the method shown in FIG. 13 may be applied to the embodiment shown in FIG. 5, and in this case the data should be stored in the EEPROM 55 shown in FIG. 6.

Third Embodiment

Next, an embodiment of the present invention applied to a radio receiver equipped with a seek function able to scan the receiving frequencies, and automatically select a station with a high receiving signal strength, is described with reference to FIGS. 14 to 17.

Figure 14:
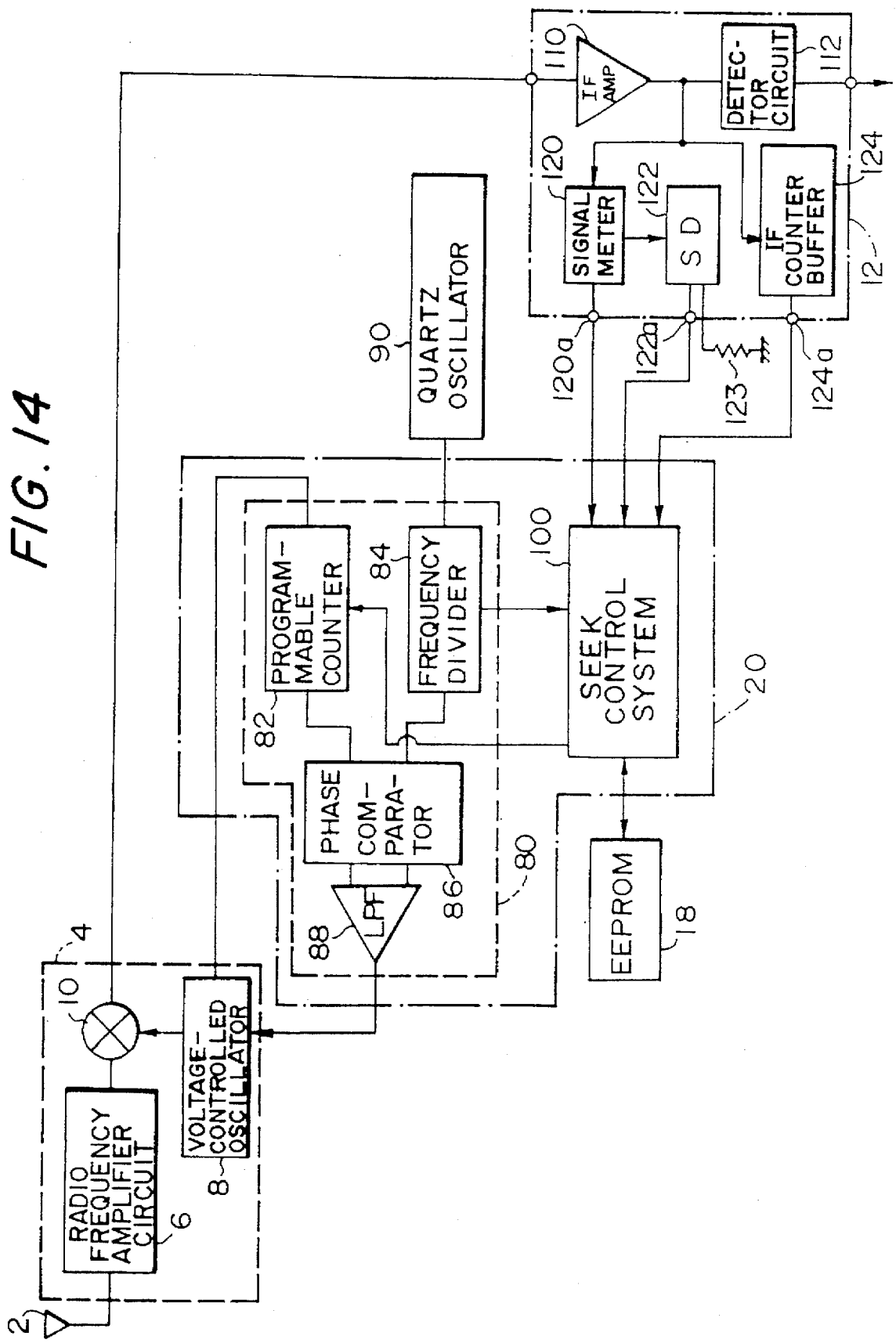
FIG. 14 is a block diagram of a variant of the present invention applied to seek control.

FIG. 14 is a block diagram of a circuit implemented within the microprocessor 20 and FM detector IC 12 shown in FIG. 1 and providing a seek function.

As shown in FIG. 14, the microprocessor 20 has a phase-looked loop (PLL) 80 which carries out electronic tuning. This PLL 80 looks the generated frequency of the voltage-controlled oscillator (VCO) 8 to for example the sum of the receiving radio frequency and the intermediate frequency. This PLL 80 comprises a programmable counter 82, a frequency divider 84, a phase comparator 86 and a low-pass filter (LPF) 88. The frequency divider 84 divides a reference frequency from a reference frequency generating quartz oscillator 90. Within the microprocessor 20 is also provided a seek control system 100. This seek control system 100 sets values corresponding to the station frequencies to be selected in seek operation. When the seek function is selected from the operating section 16 in FIG. 2, the values output by the seek control system 100 are updated for the frequency of each FM broadcasting station. For example, for broadcasting in Japan the value is updated by 100 kHz, in the United States it is updated by 200 kHz, and in Europe it is updated by 50 kHz. Thus, when the seek function is used, the seek control system 100 scans the receiving frequencies for consecutive stations, and when it detects a station with a high signal strength, it stops scanning. To seek out a station with a high signal strength, data from the first to third pins 120a, 122a and 124a of the FM detector IC 12 are input to the seek control system 100. Specifically, within the FM detector IC 12 are provided an IF amplifier 110 which amplifies intermediate frequencies, a detector circuit 112 for FM detection, and also a signal meter 120, a station detector (SD) 122 and IF counter buffer 124. The first pin 120a is connected to the signal meter 120 within the FM detector IC 12. The first pin 120a is an output pin for outputting a signal meter output. The second pin 122a is connected to the station detector (SD) 122 within the FM detector IC 12, and outputs an SD output which is either high or low. The third pin 124a is connected to the IF counter buffer 124 within the FM detector IC 12, and outputs an intermediate frequency (IF).

Figure 15:
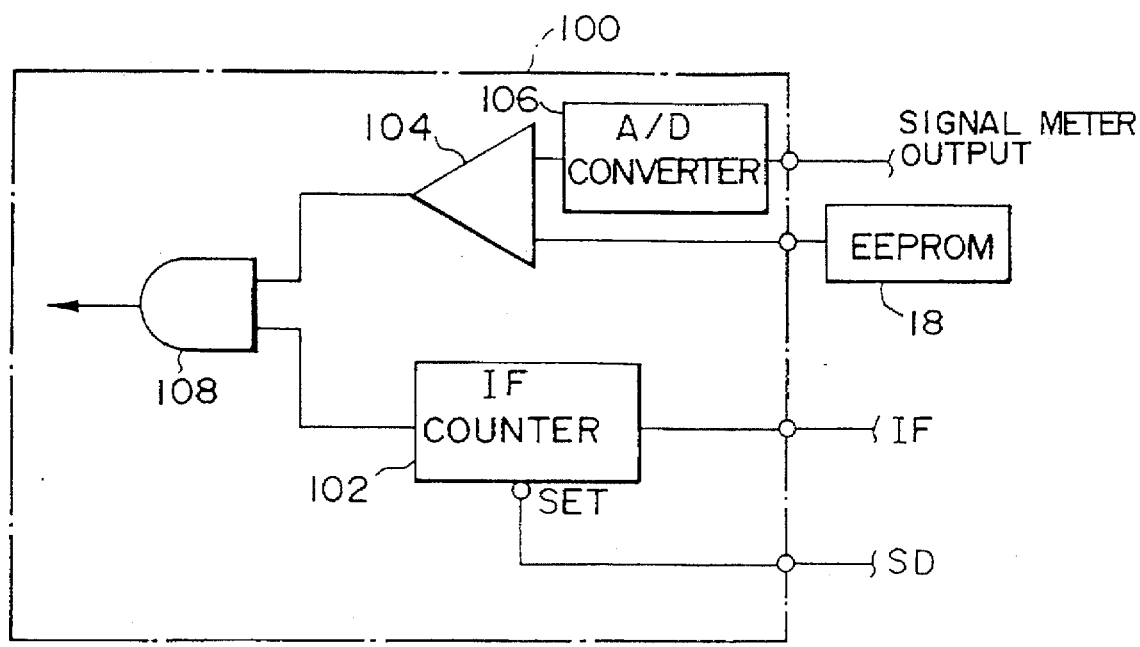
FIG. 15 is a block diagram illustrating details of the seek control in FIG. 14.
Figure 16:
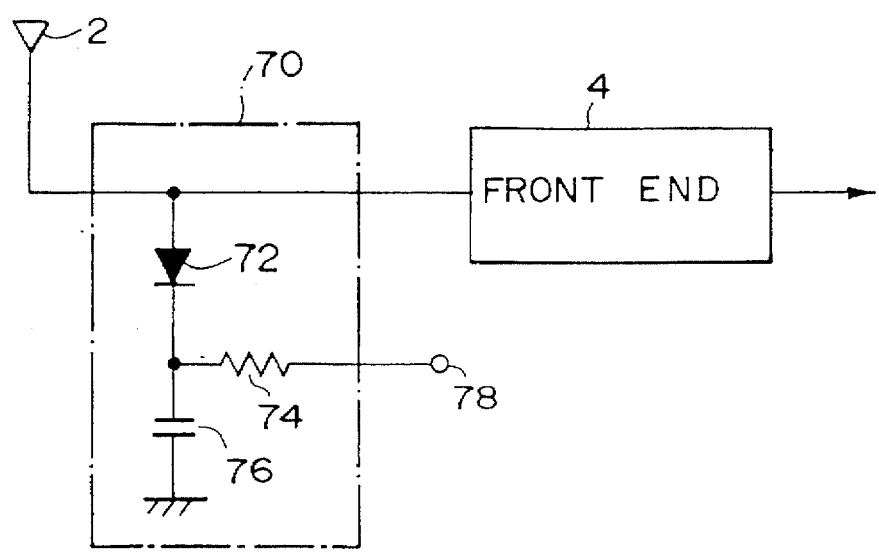
FIG. 16 is a block diagram of a radio receiver with a local/distance function.

FIG. 15 shows the details of the seek control system 100 to which these various items of data are input. As shown in this figure, within the Seek control system 100 are provided an IF counter 102, a comparator 104, an A/D converter 106 and an AND gate circuit 108. When a station detection signal is output from the station detector (SD) 122, that is, when the SD output goes high, the IF counter 102 measures the intermediate frequency. When the IF counter 102 measures the intermediate frequency of 10.7 MHz, its output goes high. At the same time, the comparator 104 receives the signal meter output to one of its terminals through the A/D converter 106. To the other terminal of the comparator 104 is input a value previously stored in the EEPROM 18 at a factory adjustment stage. The output of the comparator 104 goes high only when the signal meter output supplied through the A/D converter 106 is higher than the value stored in the EEPROM 18.

The output of the AND gate circuit 108 goes high only when the outputs of both the IF counter 102 and the comparator 104 are high. When the output of the AND gate circuit 108 goes high, a scanning by the seek control system 100 is stopped on the receiving frequency.

In order for the output of the AND gate circuit 108 to go high, the following conditions a) and b) must both hold.

a) Conditions for frequency

The output of the IF counter 102 goes high only when the input intermediate frequency is 10.7 MHz, and this condition represents the case that the frequency conditions are met. The IF counter 102 measures the intermediate frequency only when the output from the station detector (SD) 122 goes high. In this embodiment, the output of the station detector (SD) 122 is set to go high only when the level of the antenna input signal input from the antenna 2 is at least $(15\pm 5)$ dBμ. The station detection sensitivity of the station detector (SD) 122 is normally adjustable by means of a resistor 123 connected thereto. In this embodiment, there is a relatively wide range, of $(15\pm 5)$ dBμ, for which the output of the station detector (SD) 122 is set to go high. It is therefore possible to achieve the station detection sensitivity of $(15\pm 5)$ dBμ within the range of tolerance of the resistor 123. The resistor 123 may therefore be a fixed resistor. Thus, in this embodiment, the range of antenna levels at which the output of the station detector (SD) 122 goes high is set to be relatively wide, and the condition for the IF counter 102 to begin measuring is relaxed.

b) Conditions for signal strength

In the EEPROM 18 is held in digital form the value of the output of the signal meter 120 when a 20 dBμ antenna input level is input through the antenna 2 in an adjustment stage during manufacture. Therefore, during a seek operation, by comparing the actual output of the signal meter with the stored value in the EEPROM 18 in the comparator 104, it is possible to determine whether or not the input level to the antenna 2 is at least 20 dBμ. Thus the output of the comparator 104 goes high only when the antenna input level input to the antenna 2 is at least 20 dBμ.

Figure 17:
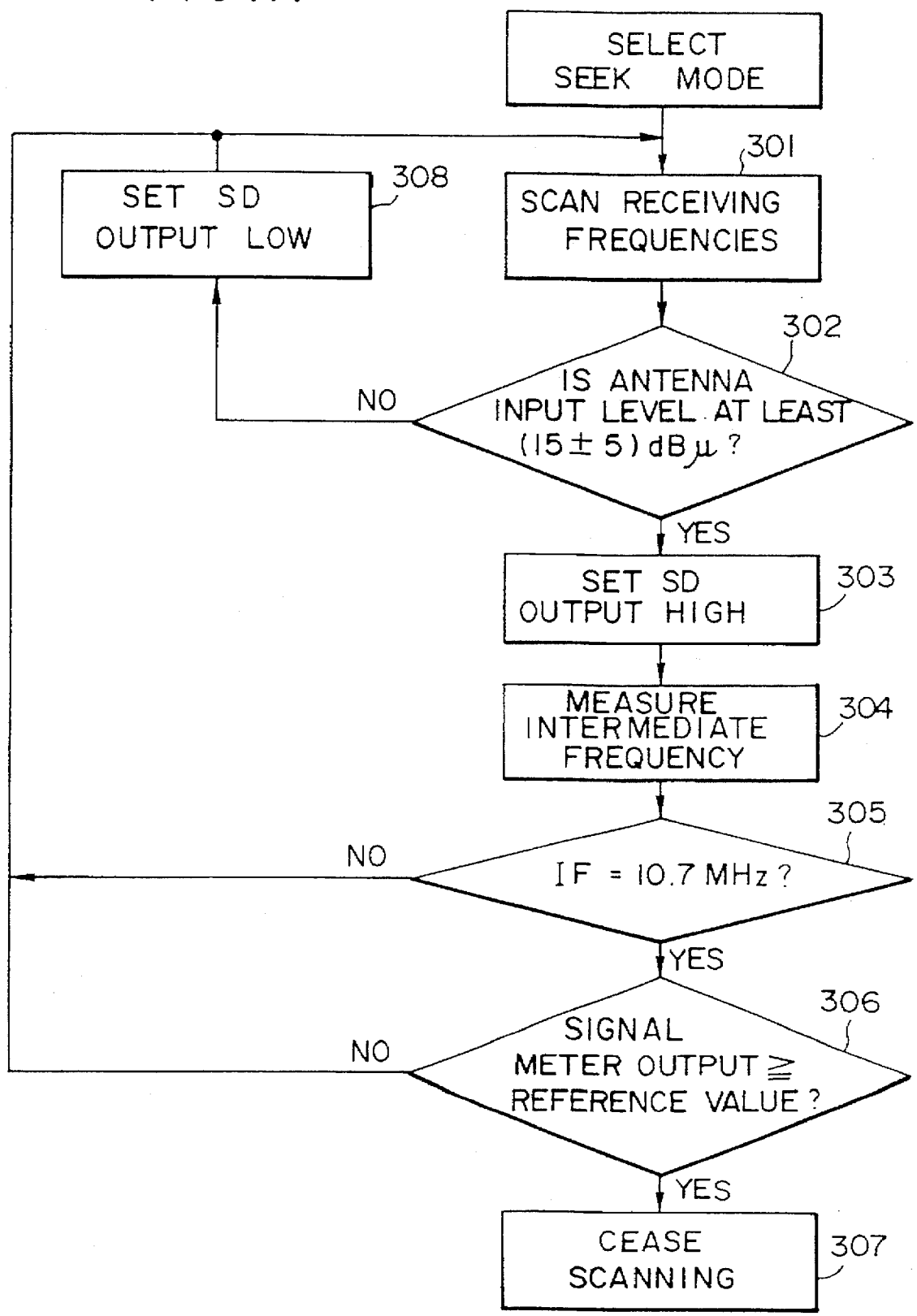
FIG. 17 is a flowchart illustrating the seek operation of the device shown in FIG. 14.

The seek operation is shown in the flowchart of FIG. 17. As shown in this figure, when a seek operation is started, the seek control system 100 sends a frequency selection order to the programmable counter 82, for example in the case of Japanese broadcasting at 100 kHz intervals, and the receiving frequency scan starts (step 301). Next, depending on the yes/no decision made in step 302, that is, depending on the receiving signal strength, either in step 303 the SD output is set high, or in step 308 the SD output is set low. Because of the variability of the value of the resistor 123, the SD output of the station detector (SD) 122 of the FM detector IC 12 goes high only when the antenna input level is at least $(15\pm 5)$ dBμ. Depending on the individual receiver, therefore, the SD output may go high when the antenna input level is 10 dBμ or above, or the SD output may go high when the antenna input level is 20 dBμ or above. Thus, there is a variation of up to 10 dBμ from receiver to receiver in the antenna input level, but in all cases, as shown in step 304, measuring of the intermediate frequency by the IF counter 102 begins.

The signal input to the station detector (SD) 122 has a so-called S-shaped characteristic extending either side (for example ±50 kHz) of the center frequency. There may, therefore, be cases in which a signal of a frequency intermediate between two station frequencies causes the SD output to go high. In this case, only when the intermediate frequency is 10.7 MHz, that is, only when the broadcasting station is unambiguously confirmed, the output of the IF counter 102 goes high (step 305). Thus, the frequency conditions as specified in a) above are met. If in step 305 a "No" decision is made, control returns to step 301, and the receiving frequency is updated.

In the flowchart of FIG. 17, the decision of step 306, that is, the decision on the sensitivity conditions b), is shown as being carried out after step 305, but in reality the decision of step 306 is carried out in parallel with steps 304 and 305. That is to say, the comparator 104 compares the actual signal meter output with the signal meter output value corresponding to a 20 dBμ antenna input level, which has been previously stored in the EEPROM 18. The output of the comparator 104 goes high only when the actually input signal meter output is equal to or more than the stored value. Thus it comes about that the sensitivity conditions as specified in b) above are met. Moreover, only in the case that a "Yes" decision is made in both of steps 305 and 306, scanning is stopped in step 307. Even if the frequency conditions are met in step 305, there are cases in which the sensitivity conditions are not met in step 306. This case means either that there is no station on the receiving frequency, or that the signal strength from the station is too low. In both of these cases the decision of step 306 is "No", and control returns to step 301, for the receiving frequency to be set to a frequency corresponding to the next station.

The seek operation as described above is also, as shown in FIG. 16, applicable to the case of a radio receiver having an attenuator 70. The attenuator 70 has a diode 72 and a capacitor 76 connected in series between the signal line and ground. It also has a resistor 74 with one end connected to the junction between the diode 72 and capacitor 76, and with the other end 78 forming a control voltage input terminal. This terminal 78 has a local/distance control voltage applied thereto. Thus, in cases where the station being received is close, when the broadcast signal strength is high, an operation is carried out in the operating section 16 to select local mode, and a low voltage is applied to the terminal 78. As a result, the attenuator 70 functions to attenuate the antenna level, for example attenuating the antenna level by between 16 and 19 dB. When, on the other hand, the station being received is distant, and the broadcast signal strength is low, an operation is carried out in the operating section 16 to select distance mode, and a high voltage is applied to the terminal 78. As a result, the diode 72, acting as a switch, goes open circuit, and the attenuator 70 ceases to function. The attenuation of 16 to 19 dB in the attenuator 70 as described above is subject to variation because of the variability of the resistance value; of the diode. In this embodiment, even with variability in the attenuation of the attenuator 70 from unit to unit, by carrying out step 306 in FIG. 17, it is possible to surely stop scanning the receiving frequency, in local mode also, when the antenna input level is at least 20 dBμ in the case where the attenuation amount of the attenuator 70 is taken into consideration. It should be noted that the third embodiment may also be applied to an AM receiver.

Fourth Embodiment

Figure 18:
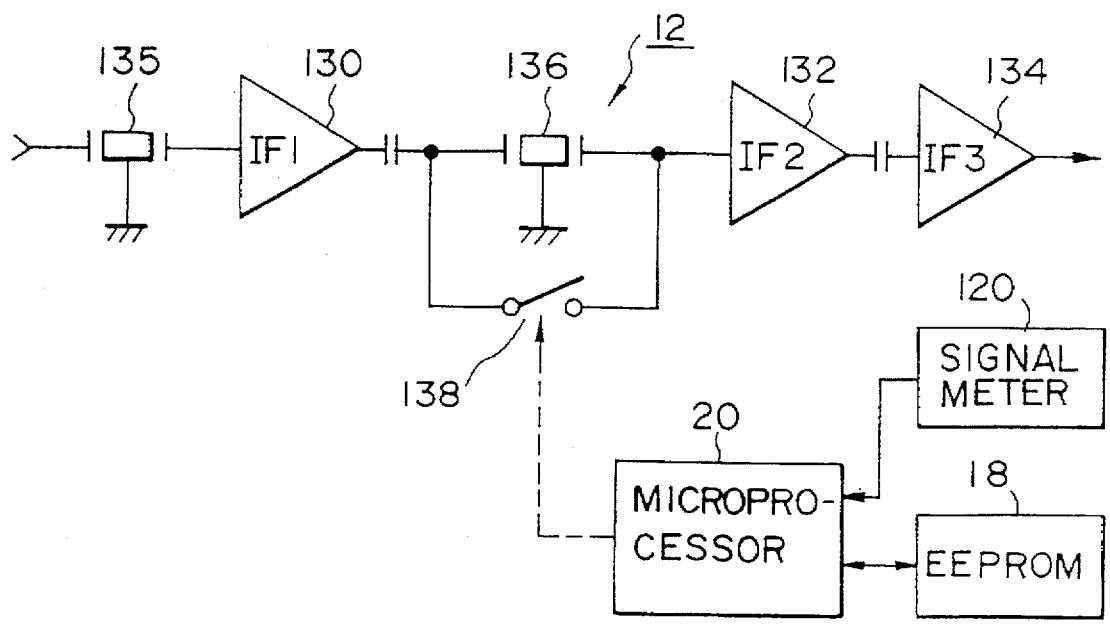
FIG. 18 is a block diagram showing essential parts of a radio receiver equipped with an automatic wide/narrow selector function.
Figure 19:
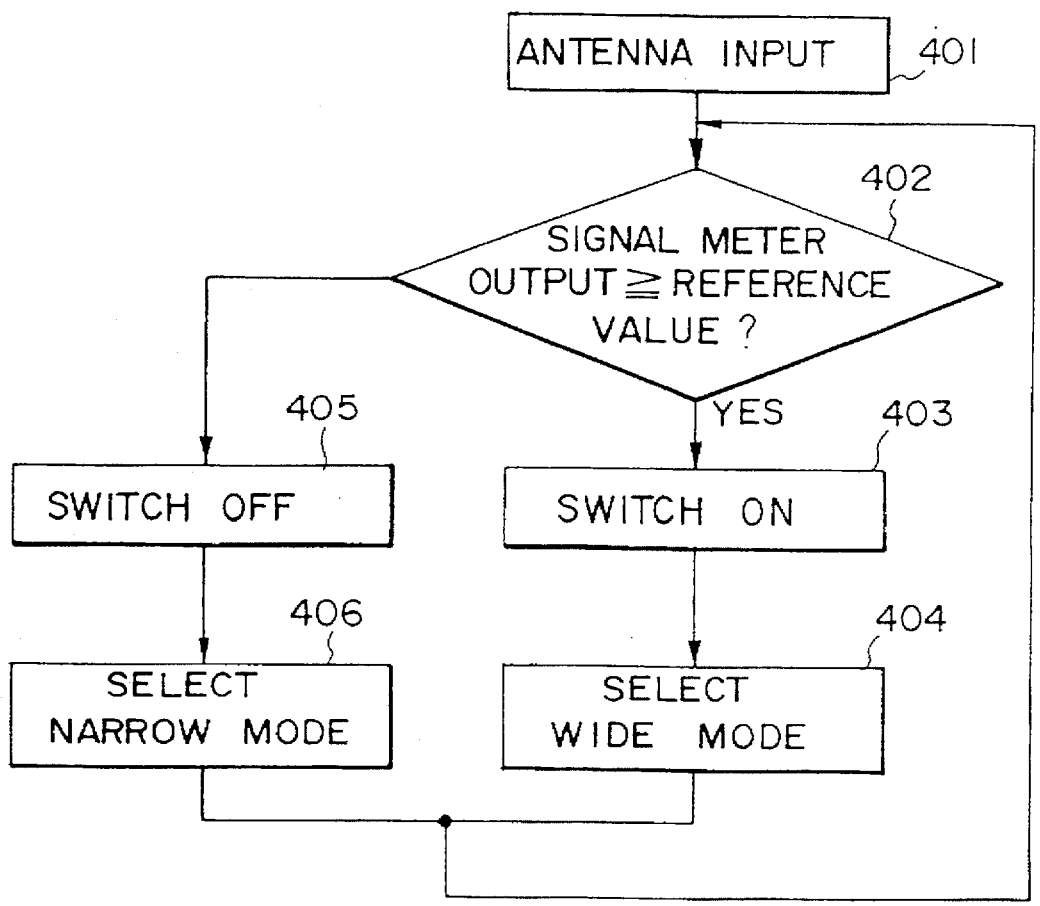
FIG. 19 is a flowchart illustrating the automatic wide/narrow selector function of the device shown in FIG. 18.

Next an embodiment of the present invention applied to a radio receiver equipped with an automatic wide/narrow selection function is described, with reference to FIGS. 18 and 19.

FIG. 18 illustrates the case in which the FM detector IC 12 shown in FIG. 2 has three IF amplifiers 130, 132 and 134. A first bandpass filter 135 is disposed before the first IF amplifier 130. Additionally, between the first and second IF amplifiers 130 and 132 are disposed a bandpass filter 136, comprising for example a ceramic filter, and a switch 138 which switches on and off the effect of this bandpass filter 136. The bandpass filters 135 and 136 and the switch 138 are components external to the IC 12. The bandpass filters 135 and 136 pass only the intermediate frequency band, and in the case of FM are 10.7 MHz bandpass filters, and in the case of AM, 450 kHz bandpass filters. In the narrow mode, by turning off the switch 138, the bandpass filter 136 also functions in addition to the bandpass filter 135. In this narrow mode, high selectivity receiving conditions are established. On the other hand, in the wide mode, the switch 138 is turned on, so that the bandpass filter 136 does not function. In this case, conditions for high fidelity reception are established. In this embodiment, the on/off operation of the switch 138 is controlled by an output from the microprocessor 20. For this purpose, the microprocessor 20 has a signal meter 120 and EEPROM 18 connected. The EEPROM 18 holds a value of the signal meter output, which is previously stored therein in an adjustment stage during manufacture, corresponding to a high signal level for switching to the wide mode, such as, for example, an antenna input level of 50 dBμ. The microprocessor 20 carries out a comparison of the actual signal meter output with the value stored in the EEPROM 18, and controls the operation of the switch 138 based on this comparison result. FIG. 19 shows the operation of this automatic wide/narrow selection. More specifically, when there is an antenna input in step 401, the microprocessor 20 makes a decision as to whether or not the signal meter output is at least the stored value (step 402). If the decision result of step 402 is "Yes", then the switch 138 is turned on (step 403), and the bandpass filter 136 does not function, thus increasing the bandwidth, and establishing the conditions for the wide mode (step 404). On the other hand, if the decision result of step 402 is "No", then the switch 138 is turned off (step 405), and the bandpass filter 136 does function, thus reducing the bandwidth, and establishing the conditions for the narrow mode (step 406). By this means, regardless of component variability from unit to unit, it is possible to select the wide mode only when there is a strong signal of 50 dBμ input from the antenna 2. It should be noted that the fourth embodiment may also be applied to an AM receiver.

Fifth Embodiment

Figure 20:
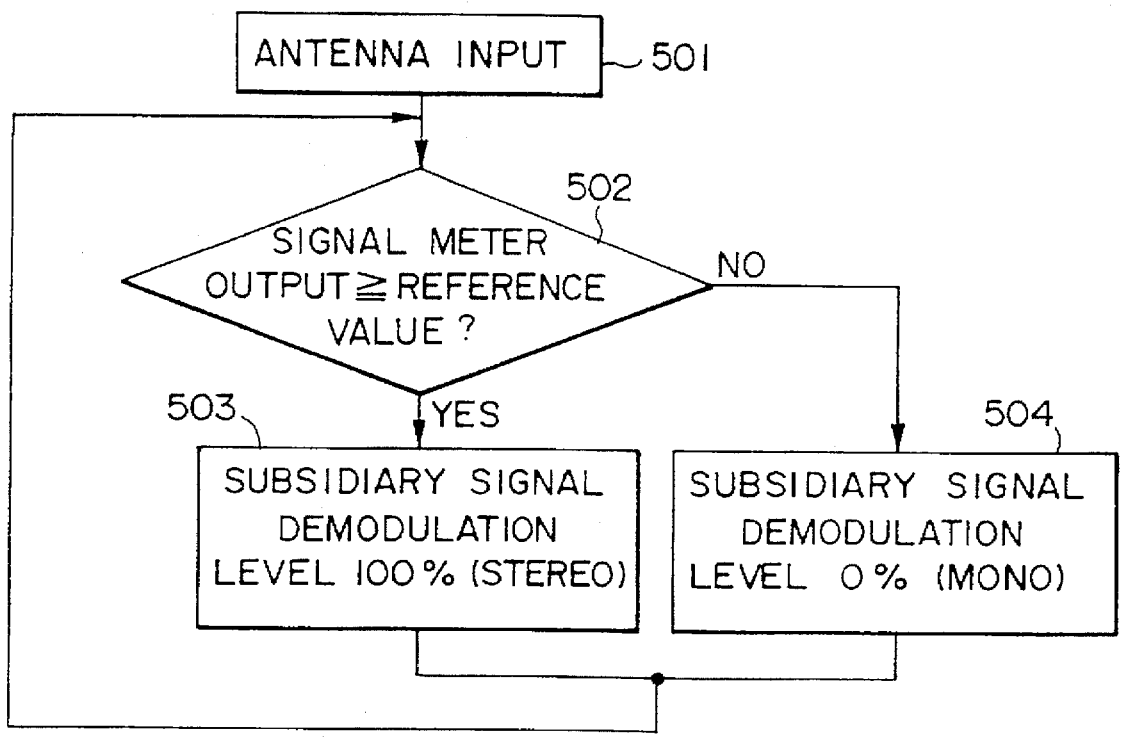
FIG. 20 is a flowchart illustrating an automatic mono/stereo selector function.

Next an embodiment of the present invention applied to a radio receiver equipped with an automatic mono/stereo selection function is described, with reference to FIG. 20.

In the radio receiver to which the fifth embodiment applies, in place of the implementation of a subsidiary signal demodulation level in the subsidiary signal demodulator 34 of FIG. 1 which varies continuously from 0 to 100%, as shown in the first embodiment, there are only two subsidiary signal demodulation levels, that is to say, 0% and 100%. The case where the subsidiary signal demodulation level is 0% is the mono mode, and the case where the subsidiary signal demodulation level is 100% is the stereo mode. In the fifth embodiment it is possible to use the microprocessor 20, signal meter 120 and EEPROM 18 shown in FIG. 18. The EEPROM 18 holds a value of the signal meter output, which is previously stored therein in an adjustment stage during manufacture, corresponding to an antenna input level (corresponding to the monaural point M in FIG. 7) of 20 dBμ input to the antenna 2.

The operation of this automatic mono/stereo selection is now described with reference to FIG. 20.

More specifically, when there is an antenna input (step 501), the microprocessor 20 makes a decision as to whether or not the signal meter output is greater than the value stored in the EEPROM 18 (step 502). If the decision result of step 502 is "Yes", then a voltage to establish the stereo mode is applied by the microprocessor 20 to the SPC pin 34a of the subsidiary signal demodulator 34, so that the subsidiary signal demodulation level is 100% (step 503). On the other hand, if the decision result of step 502 is "No", then a voltage to establish the mono mode is output, so that the subsidiary signal demodulation level is 0% (step 504).

Thus in the fifth embodiment, regardless of component variability from unit to unit, it is possible to automatically select the stereo mode only when there is an antenna input level of at least 20 dBμ input to the antenna 2. It should be noted that the fifth embodiment may also be applied to AM stereo.

Sixth Embodiment

Next an embodiment of the present invention is described in which two high frequency cutoff ratios, of 0% and 100%, are realized in the high frequency cutoff circuit 30 shown in FIG. 1. In this case also, the microprocessor 20, signal meter 120 and EEPROM 18 shown in FIG. 18 are used, and the EEPROM 18 has previously stored therein a reference value of the signal meter output corresponding to a low antenna input level, for example 10 dBμ, to the antenna 2.

Figure 21:
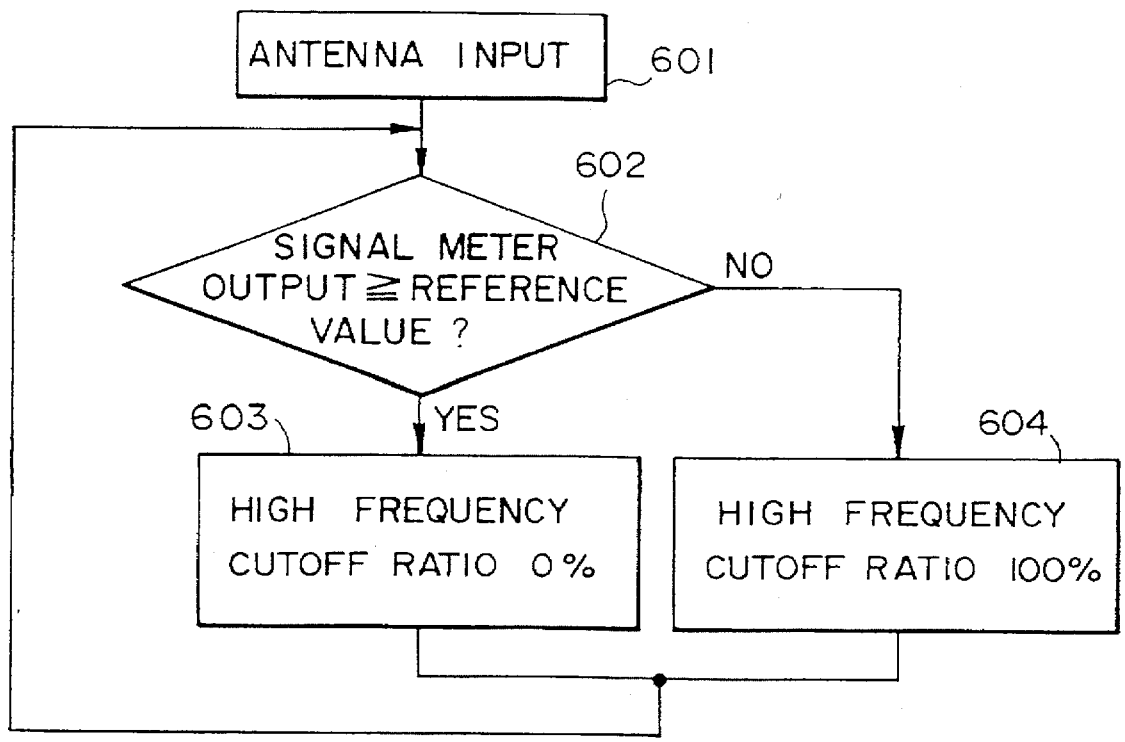
FIG. 21 is a flowchart illustrating an automatic 0%/100% high frequency cutoff ratio selector function.

The manner of operation of this embodiment is, with reference to FIG. 21, that when there is an antenna input (step 601), the microprocessor 20 makes a decision as to whether or not the signal meter output is greater than or equal to the reference value (step 602). If the decision result of step 602 is "Yes", then a relatively high voltage is applied by the microprocessor 20 to the HCC pin 30a of the high frequency cutoff circuit 30, to establish a high frequency cutoff ratio of 0% (step 603), whereas if the decision result of step 602 is "No", then a relatively voltage is applied by the microprocessor 20 to the HCC pin 30a of the high frequency cutoff circuit 30, to establish a high frequency cutoff ratio of 100% (step 604). It should be noted that the sixth embodiment may also be applied to an AM receiver.

What is claimed is:

1. A radio receiver comprising:
    a radio frequency amplifier circuit which amplifies an antenna input signal;
    a frequency conversion circuit which converts said amplified antenna input signal to an intermediate frequency signal;
    an intermediate frequency amplifier circuit which amplifies and outputs the intermediate frequency signal, and is provided with a signal meter which detects the level of said amplified intermediate frequency signal;

a detector circuit which detects an AM signal or FM signal from said amplified intermediate frequency signal;

a nonvolatile memory which stores an output of said signal meter, which is subject to component variability from unit to unit, when a predetermined reference level of said antenna input signal is input in an adjustment stage of manufacture, as a reference voltage value; and control means which, based on said signal meter output reference voltage value stored in said nonvolatile memory, sets and controls receiving conditions when different levels of said antenna input signal are input in such a way as to be appropriate to said different levels of said antenna input signal with low variability from unit to unit.

2. The radio receiver of claim 1 wherein:

the detected output of said detector circuit is a composite signal including a left channel signal and a right channel signal;

a stereo demodulation circuit demodulating said left channel signal and right channel signal is further provided;

said stereo demodulation circuit has:

a principal signal demodulation circuit which demodulates a principal signal included in said composite signal;

a subsidiary signal demodulation circuit which demodulates a subsidiary signal included in said composite signal, and varies the demodulation level of said subsidiary signal from 0 to 100% based on a stereo separation control voltage, according to predetermined stereo separation characteristics set to depend on the antenna input level; and a matrix circuit which regenerates the left channel signal and right channel signal from said demodulated principal signal and said demodulated subsidiary signal; and said control means includes a stereo separation control voltage generating means which, based on said signal meter output reference voltage value stored in said nonvolatile memory, computes a correction to said signal meter output corresponding to the actually input antenna input level and generates said stereo separation control voltage.

3. The radio receiver of claim 2 wherein:

when an antenna input signal of said reference level is input, a stereo separation control reference voltage value for setting a subsidiary signal demodulation level appropriate to the antenna input signal is further stored in said nonvolatile memory; and said stereo separation control voltage generating means, based on said signal meter output reference voltage value and said stereo separation control reference voltage value stored in said nonvolatile memory, computes a correction to said signal meter output corresponding to the actually input antenna input level and generates said stereo separation control voltage.

4. The radio receiver of claim 3 wherein:

said nonvolatile memory stores a plurality of signal meter output reference voltage values measured respectively when an antenna input level corresponding to a monaural point with a subsidiary signal demodulation level of 0% and one or a plurality of antenna input levels corresponding to a stereo separation variation region in which the antenna input level is higher than at said monaural point are input, and respective stereo separation control reference voltage values to obtain stereo separation characteristics corresponding to this plurality of signal meter output reference voltage levels; and said stereo separation control voltage generating means, based on said plurality of signal meter output reference voltage values and stereo separation control reference voltage values, when an antenna input signal of any level is input computes a stereo separation control voltage corresponding to said antenna input signal level by linear interpolation.

5. The radio receiver of claim 2 wherein:

said stereo demodulation circuit is further provided with a high frequency cutoff circuit which, depending on a high frequency cutoff control voltage, reduces the high frequency components in said composite signal at a high frequency cutoff ratio varying in a predetermined manner with the antenna input level; and said control means includes high frequency cutoff control voltage generating means which, based on said signal meter output reference voltage value stored in said nonvolatile memory, computes a correction to said signal meter output corresponding to the actually input antenna input level and generates said high frequency cutoff control voltage.

6. The radio receiver of claim 5 wherein:

in said nonvolatile memory is further stored a high frequency cutoff control reference voltage value for setting a high frequency cutoff ratio appropriate to the antenna input signal when an antenna input signal of said reference level is input; and said high frequency cutoff control voltage generating means, based on said signal meter output reference voltage value and said high frequency cutoff control reference voltage value stored in said nonvolatile memory, computes a correction to said signal meter output corresponding to the actually input antenna input level and generates said high frequency cutoff control voltage.

7. The radio receiver of claim 6 wherein:

said nonvolatile memory stores a plurality of signal meter output reference voltage values measured respectively when an antenna input level corresponding to a monaural point with a subsidiary signal demodulation level of 0% and one or a plurality of antenna input levels corresponding to a high cutoff variation region in which the antenna input level is lower than at said monaural point are input, and respective high frequency cutoff control reference voltage values to obtain high frequency cutoff characteristics corresponding to this plurality of signal meter output reference voltage levels; and said high frequency cutoff control voltage generating means, based on said plurality of signal meter output reference voltage values and high frequency cutoff control reference voltage values, when an antenna input signal of any level is input computes a high frequency cutoff control voltage corresponding to said antenna input signal level by linear interpolation.

8. The radio receiver of claim 2 further comprising, a comparator which compares said signal meter output reference voltage level stored in said nonvolatile memory with said signal meter output when said antenna input signal is input at an arbitrary level wherein;

said stereo demodulation circuit is further provided with a high frequency cutoff circuit which, depending on a high frequency cutoff control voltage, reduces the high frequency components in said composite signal at a high frequency cutoff ratio of selectively 0% or 100%;

in said nonvolatile memory is further stored the output of said signal meter when an antenna input signal corresponding to a weak broadcast signal is input, as a reference voltage value; and when said a comparator detects said signal meter output to be lower than said signal meter output reference voltage value, said control means outputs said high frequency cutoff control voltage to set said high frequency cutoff ratio to 100%.

9. The radio receiver of claim 1 wherein:

said intermediate frequency amplifier circuit has:
 a station detector which, based on said signal meter output level outputs a station detection signal when the level of said antenna input signal is within a predetermined range or exceeds the upper limit of said range; and
 a buffer for counting said intermediate frequency;

said nonvolatile memory stores said signal meter output when an antenna input signal is input of a level close to or greater than or equal to the upper limit of said predetermined range determined such that said station detection signal is output from said station detector, as said reference voltage value;

said control means includes seek control means which carries out an automatic scan of receiving frequencies, and causes a stop to the scan at a frequency of high sensitivity; and said seek control means comprising:
 an intermediate frequency counter which counts the output from said buffer for counting said intermediate frequency when said station detection signal is input from said station detector; and
 a comparator which compares said signal meter output reference voltage level stored in said nonvolatile memory with said signal meter output when said antenna input signal is input at an arbitrary level;
 whereby ceasing said automatic scan when said intermediate frequency counter counts a predetermined intermediate frequency and said comparator detects said signal meter output to be higher than said signal meter output reference voltage level.

10. The radio receiver of claim 9 wherein:

at a stage preceding said radio frequency amplifier circuit an attenuator is provided which attenuates high antenna input levels;

means for specifying a selection of a local mode or a distance mode for said control means is provided; and said control means includes first mode setting means which when said local mode is selected controls said attenuator to operate, and when said distance mode is selected controls said attenuator not to operate.

11. The radio receiver of claim 1 wherein:

said intermediate frequency amplifier circuit includes a bandpass filter which passes only the frequency band of said intermediate frequency, and switching means switching this bandpass filter between functionally operating and non-operating states;

in said nonvolatile memory is stored the signal meter output when an antenna input signal corresponding to a strong broadcast signal is input, as a reference voltage value;

said control means includes second mode setting means which controls the enablement of a wide bandwidth receiving mode for high fidelity or a narrow bandwidth receiving mode for high selectivity; and said second mode setting means has a comparator which compares said signal meter output reference voltage level stored in said nonvolatile memory with said signal meter output when said antenna input signal, is input at an arbitrary level, and when said comparator detects said signal meter output to be higher than said signal meter output reference voltage level, controls the enablement of said wide bandwidth receiving mode.

12. The radio receiver of claim 1 wherein:

the detected output of said detector circuit is a composite signal including a left channel signal and a right channel signal;

a stereo demodulation circuit demodulating said left channel signal and right channel signal is further provided;

said stereo demodulation circuit has:
 a principal signal demodulation circuit which demodulates a principal signal included in said composite signal;
 a subsidiary signal demodulation circuit which demodulates a subsidiary signal included in said composite signal, and changes the demodulation level of said subsidiary signal to 0% or 100% based on a stereo separation control voltage, according to predetermined stereo separation characteristics set to depend on the antenna input level; and
 a matrix circuit which regenerates the left channel signal and right channel signal from said demodulated principal signal and subsidiary signal;

in said nonvolatile memory is stored the output of said signal meter when an antenna input signal corresponding to a monaural point is input, as a reference voltage value; and said control means includes a comparator which compares said signal meter output reference voltage level stored in said nonvolatile memory with said signal meter output when said antenna input signal is input at an arbitrary level, and when said comparator detects said signal meter output to be higher than said signal meter output reference voltage level, outputs said stereo separation control voltage to set said subsidiary signal demodulation level to 100%.

13. A radio receiver selecting a tuner for reception from a plurality of tuners, each comprising a receiving circuit including elements from an antenna to a detector circuit, wherein:

each of said tuners comprises:
 a radio frequency amplifier circuit which amplifies an antenna input signal;
 a frequency conversion circuit which converts said amplified antenna input signal to an intermediate frequency signal;
 an intermediate frequency amplifier circuit which amplifies and outputs the intermediate frequency signal, and is provided with a signal meter which detects the level of said amplified intermediate frequency signal; and
 a detector circuit which detects an AM signal or FM signal from said amplified intermediate frequency signal;

said radio receiver further comprising:
 a first switch selectively outputting the output of said detector circuit of said respective tuner;
 a nonvolatile memory which stores an output of said signal meter, which is subject to variability from tuner to tuner when a predetermined reference level of said antenna input signal is input in an adjustment stage of manufacture, for each of said tuners as corresponding reference voltage values; and control means which receives the respective signal meter outputs when arbitrary levels of said antenna input signals are input to said tuners, and controls the operation of said first switch to select the tuner with the highest antenna input level; and said control means includes:
- calculation means which, based on said signal meter output reference voltage values stored in said nonvolatile memory, computes a correction to said signal meter output from each of said tuners corresponding to arbitrary levels of said antenna input signals, to compute accurate level comparison values for said antenna input signal levels, and a comparator for comparing said level comparison values for each of said tuners;
- whereby the operation of said first switch is controled to select the tuner for which said level comparison value is highest.

14. The radio receiver of claim 13 wherein:

the detected output of said detector circuit of each of said tuners is a composite signal including a left channel signal and a right channel signal;

a stereo demodulation circuit demodulating said left channel signal and right channel signal is further provided at a stage following said first switch;

said stereo demodulation circuit has:
- a principal signal demodulation circuit which demodulates a principal signal included in said composite signal;
- a subsidiary signal demodulation circuit which demodulates a subsidiary signal included in said composite signal, and varies the demodulation level of said subsidiary signal from 0 to 100% based on a stereo separation control voltage, according to predetermined stereo separation characteristics set to depend on the antenna input level; and
- a matrix circuit which regenerates the left channel signal and right channel signal from said demodulated principal signal and said demodulated subsidiary signal;

said calculation means of said control means, based on said signal meter output reference voltage values stored in said nonvolatile memory, computes a correction to each of said signal meter outputs corresponding to the actually input antenna input level, and then computes a stereo separation control voltage as said level comparison values; and being further provided with a second switch which outputs the highest stereo separation control voltage for each of said tuners computed by said calculation means to said subsidiary signal demodulation circuit of said stereo demodulation circuit.

15. The radio receiver of claim 14 wherein:

when an antenna input signal of said reference level is input, a stereo separation control reference voltage value which sets a subsidiary signal demodulation level appropriate to said antenna input signal is further stored in said nonvolatile memory for each of said tuners; and said calculation means of said control means, based on said signal meter output reference voltage values and said stereo separation control reference voltage values stored in said nonvolatile memory, computes a correction to each of said signal meter outputs corresponding to the actually input antenna input level, and generates said stereo separation control voltages.

16. The radio receiver of claim 15 wherein:

in said nonvolatile memory are stored for each of said tuners a plurality of signal meter output reference voltage values measured respectively when an antenna input level corresponding to a monaural point with a subsidiary signal demodulation level of 0% and one or a plurality of antenna input levels corresponding to a stereo separation variation region in which the antenna input level is higher than at said monaural point are input, and respective stereo separation control reference voltage values to obtain stereo separation characteristics corresponding to this plurality of signal meter output reference voltage levels; and said calculation means of said control means, based on said plurality of signal meter output reference voltage values and said stereo separation control reference voltage values, when an antenna input signal of any level is input computes for each of said tuners a stereo separation control voltage corresponding to said antenna input signal level by linear interpolation.

17. The radio receiver of claim 14 wherein:

said stereo demodulation circuit is further provided with a high frequency cutoff circuit which, depending on a high frequency cutoff control voltage, reduces the high frequency components in said composite signal at a high frequency cutoff ratio varying in a predetermined manner with the antenna input level;

said control means includes high frequency cutoff control voltage generating means which, based on said signal meter output reference voltage values stored in said nonvolatile memory for each of said tuners, computes a correction to said signal meter output corresponding to the actually input antenna input level and generates said high frequency cutoff control voltage for each of said tuners; and being further provided with a third switch which outputs said high frequency cutoff control voltage for the one tuner selected by said comparator among said high frequency cutoff control voltages for each of said tuners to said high frequency cutoff circuit of said stereo demodulation circuit.

18. The radio receiver of claim 17 wherein:

in said nonvolatile memory is further stored for each of said tuners a high frequency cutoff control reference voltage value for setting a high frequency cutoff ratio appropriate to the antenna input signal when an antenna input signal of said reference level is input; and said high frequency cutoff control voltage generating means, based on said signal meter output reference voltage values and said high frequency cutoff control reference voltage values stored in said nonvolatile memory, computes a correction to said signal meter output corresponding to the actually input antenna input level and generates said high frequency cutoff control voltages.

19. The radio receiver of claim 18 wherein:

said nonvolatile memory stores for each of said tuners a plurality of signal meter output reference voltage values measured respectively when an antenna input level corresponding to a monaural point with a subsidiary signal demodulation level of 0% and one or a plurality of antenna input levels corresponding to a high frequency cutoff region in which the antenna input level is lower than at said monaural point are input, and respective high frequency cutoff control reference voltage values to obtain high frequency cutoff characteristics corresponding to this plurality of signal meter output reference voltage levels; and said high frequency cutoff control voltage generating means, for each of said tuners, based on said plurality of signal meter output reference voltage values and high frequency cutoff control reference voltage values, when an antenna input signal of any level is input computes a high frequency cutoff control voltage corresponding to said antenna input signal level by linear interpolation.

* * * * *